United States Patent

Iwano et al.

[11] Patent Number: 6,039,025
[45] Date of Patent: Mar. 21, 2000

[54] INTERNAL COMBUSTION ENGINE

[75] Inventors: Hiroshi Iwano; Isamu Kazama, both of Kanagawa; Masayuki Yasuoka, Yokohama, all of Japan

[73] Assignee: Nissan Motor Co., Ltd., Yokohama, Japan

[21] Appl. No.: 09/094,454

[22] Filed: Jun. 10, 1998

[30] Foreign Application Priority Data

Jun. 10, 1997 [JP] Japan .................................... 9-152591
Jul. 25, 1997 [JP] Japan .................................... 9-200432

[51] Int. Cl.[7] ....................................................... F02D 1/00
[52] U.S. Cl. ...................................... 123/399; 123/568.26
[58] Field of Search ............................... 123/399, 568.26, 123/568.21

[56] References Cited

U.S. PATENT DOCUMENTS

| 5,209,214 | 5/1993 | Ikuta et al. | 123/568.26 |
| 5,359,975 | 11/1994 | Katashiba et al. | 123/568.26 |
| 5,611,309 | 3/1997 | Kumaagi et al. | 123/399 |
| 5,724,950 | 3/1998 | Shino et al. | 123/568.21 |
| 5,797,370 | 8/1998 | Kimura et al. | 123/568.21 |
| 5,832,896 | 11/1998 | Phipps | 123/568.21 |

FOREIGN PATENT DOCUMENTS

| 53-140420 | 12/1978 | Japan . |
| 2-291437 | 12/1990 | Japan . |

*Primary Examiner*—John Kwon
*Attorney, Agent, or Firm*—Foley & Lardner

[57] ABSTRACT

A cylinder direct injection spark-ignition internal combustion engine comprising an EGR system is provided to control an amount of EGR gas recirculated from an exhaust gas passage to an intake air passage in which a throttle valve is disposed. The EGR system includes an EGR passage connecting the exhaust gas passage and the intake air passage, and an EGR valve disposed in the EGR passage. A control system is provided to control the EGR valve and the throttle valve. The control system includes a section for calculating a fresh air amount conversion value of an amount of the EGR gas, the fresh air amount conversion value being an amount of fresh air to be introduced to the intake system through the EGR system in place of the amount of the EGR gas. The control system further includes a section for controlling respective opening degrees of the throttle valve and the EGR valve in accordance with the fresh air amount conversion value.

12 Claims, 14 Drawing Sheets

INTERNAL COMBUSTION ENGINE

The contents of Japanese Patent Application No. 9-152591, with a filing date of Jun. 10, 1997 in Japan (published Dec. 22, 1998, as Publication No. 10339191), and of Japanese Patent Application No. 9-200432, with a filing date of Jul. 25, 1997 (published Feb. 16, 1999, as Publication No. 11044240) are hereby incorporated by reference.

BACKGROUND OF THE INVENTION

1. Field of the Invention

This invention relates to improvements in an internal combustion engine, and more particularly to the improvements in control of an amount of intake air inducted into the engine and an amount of EGR (Exhaust Gas Recirculation) gas recirculated from an exhaust gas passage back to an intake air passage of the engine.

2. Description of the Related Art

Hitherto a variety of EGR control techniques have been proposed and put into practice to effectively control an EGR rate in accordance with engine operating conditions, as disclosed, for example, in Japanese Patent Provisional Publication No. 53-140420. These techniques are basically arranged as follows: A basic opening area of an EGR valve is determined by multiplying an opening area of a throttle valve by a target EGR rate. The basic opening area of the EGR valve is corrected by an amount corresponding to a change in an EGR gas flow amount due to exhaust gas pressure and temperature, thereby setting a target value of the opening area of the EGR valve.

However, drawbacks have been encountered in such conventional EGR control techniques, in which a condition (such as pressure and temperature) within the intake system is changed by EGR gas. Consequently, the amount of intake air is unavoidably changed with an EGR rate even when the opening area of the throttle valve is the same, and therefore a required EGR rate cannot be realized at a high precision while causing a stepwise torque change in the engine. Additionally, particularly in a cylinder direct injection spark-ignition engine which has been recently promoted in development and makes so-called stratified charge combustion in a cylinder, it is required to largely increase the EGR rate in order to cope with an increase in NOx emission due to engine operation on an extremely lean air-fuel mixture. In this case, control error in EGR rate largely affects operation of the engine and cannot be ignored, although the control error is small in conventional engines having an EGR rate lower than 10%.

Furthermore, in engines where so-called torque demand control is accomplished, a throttle valve is electronically controlled in order to introduce intake air in an amount required corresponding to a target torque. Also in such engines, the amount of intake air is unavoidably changed with the EGR rate thereby making it difficult to appropriately control the relationship between the target torque and a target amount of the intake air.

BRIEF SUMMARY OF THE INVENTION

It is an object of the present invention to provide an improved internal combustion engine which can effectively overcome the drawbacks encountered in conventional internal combustion engines.

Another object of the present invention is to provide an improved internal combustion engine in which an EGR rate can be controlled at a high accuracy without being effected by a condition of EGR gas.

A further object of the present invention is to provide an improved internal combustion engine arranged to accomplish a torque demand control in which a required amount of intake air is sucked corresponding to a target torque, which can effectively control the relationship between the target torque and a target amount of the intake air.

A first aspect of the present invention resides in an internal combustion engine comprising an EGR system for fluidly connecting an intake air passage and an exhaust gas passage and for controlling an amount of EGR gas recirculated from the exhaust gas passage to the intake air passage. A control system is provided to control the EGR system and a fresh air amount metering valve of the engine. The control system includes a section for calculating a fresh air amount conversion value of an amount of the EGR gas, the fresh air amount conversion value being an amount of fresh air to be introduced to the intake air passage through the EGR system in place of the amount of the EGR gas. The control system further includes a section for controlling the EGR system in accordance with the fresh air amount conversion value.

Thus, according to the above aspect of the present invention, the EGR system is controlled in accordance with the fresh air amount conversion value which is the amount of fresh air to be introduced through the EGR system in place of the amount of the EGR gas. Therefore, a target EGR rate can be controlled at a high accuracy without being affected by quantity of state of EGR gas.

A second aspect of the present invention resides in an internal combustion engine comprising an EGR system including an EGR valve disposed in an EGR passage for connecting an exhaust system and an intake system. A fresh air amount metering valve is disposed in the intake system. A control system includes a section for detecting an engine operating condition of the engine; a section for calculating a target intake air amount in accordance with the engine operating condition; a section for calculating a target EGR gas amount in accordance with the engine operating condition; a section for calculating a fresh air amount conversion value of the target EGR gas amount, the fresh air amount conversion value being an amount of fresh air to be introduced through the EGR system in place of the target EGR gas amount; a section for calculating respective opening areas of the fresh air amount metering valve and the EGR valve in accordance with the target intake air amount and the fresh air amount conversion value; a section for controlling an opening degree of the fresh air amount metering valve in accordance with the opening area of the fresh air amount metering valve; and a section for controlling an opening degree of the EGR valve in accordance with the area of the EGR valve.

According to the above aspect of the present invention, the target EGR gas amount is converted into the amount of fresh air (or the fresh air amount conversion value) on the assumption that the fresh air is introduced through the EGR valve in place of the EGR gas. As a result, the opening area of a fresh air amount introduction system (or the intake system) and the opening area of the EGR valve are calculated in accordance with the target intake air amount (or target fresh air amount) and the fresh air amount conversion value of EGR gas amount. Here, in case that the fresh air amount metering valve is an electronically controlled throttle valve for controlling the whole amount of the fresh air amount, the opening area of the fresh air amount metering valve is equal to the opening area of the fresh air amount introduction system. Otherwise, in case that the fresh air amount metering valve is an auxiliary air control valve disposed bypassing the throttle valve, the opening area of the fresh air amount metering valve is determined by subtracting the opening area of the throttle valve from the opening area of the fresh air amount introduction system.

By thus converting the EGR gas amount into the fresh air amount, the fresh air amount conversion value is determined in accordance with the quantity of state of EGR gas. The opening area of the EGR valve is determined in accordance with the fresh air amount conversion value. As a result, the target EGR gas amount and accordingly the target EGR rate can be controlled at a high accuracy without being affected by the quantity of state of EGR gas. Particularly even in case that control at a high EGR rate is made like during stratified charge combustion, excellent combustion performance and exhaust emission performance can be obtained.

A third aspect of the present invention resides in an internal combustion engine comprising a throttle valve disposed in an intake system of the engine. An EGR system includes an EGR valve disposed in an EGR passage connecting an exhaust system and the intake system, EGR gas being recirculated back to the intake system through the EGR valve. A control system includes a throttle valve operating section for operating the throttle valve; an engine speed detecting section for detecting an engine speed of the engine; an intake air amount detecting section for detecting an amount of intake air to be supplied to the engine; a fresh air amount conversion section for converting an amount of the EGR gas into an amount of fresh air in accordance with a quantity of state of the EGR gas by using a conversion coefficient so as to obtain a fresh air amount conversion value; a temperature correction term calculating section for calculating a correction term relating to a temperature within the intake system, for the conversion coefficient, in accordance with at least the engine speed; a pressure correction term calculating section for calculating a correction term relating to a pressure within the intake system, for the conversion coefficient, in accordance with at least the intake air amount; a total gas amount calculating section for calculating a total gas amount to be supplied to the engine, in accordance with the intake air amount and the fresh air amount conversion value of the EGR gas amount; a total opening area calculating section for calculating a total opening area for the throttle valve and the EGR valve, in accordance with the total gas amount; a ratio calculating section for calculating a first ratio of the fresh air amount conversion value of the EGR gas amount and the total gas amount and a second ratio of the intake air amount and the total gas amount; an opening area calculating section for calculating respective opening areas of the throttle valve and the EGR valve by dividing the total opening area in accordance with the first and second ratios; a target opening degree calculating section for calculating respective target opening degrees of the throttle valve and the EGR valve in accordance with the respective opening areas; a throttle valve opening degree controlling section for controlling the throttle valve operating section in a manner that the throttle valve takes the target opening degree which has been calculated; and an EGR valve opening degree controlling section for controlling the EGR valve in a manner that the EGR valve takes the target opening degree which has been calculated.

A fourth aspect of the present invention resides in an internal combustion engine comprising a throttle valve disposed in an intake system of the engine. An EGR system is provided to controllably recirculate EGR gas to the intake system. The EGR system includes an EGR valve disposed in an EGR passage for fluidly connecting the intake system and an exhaust system of the engine, the EGR valve being adapted to control an amount of EGR gas recirculated from the exhaust gas passage to the intake air passage. A control system includes a section for converting an amount of the EGR gas into an amount of fresh air in accordance with a quantity of state of the EGR gas by using a conversion coefficient so as to obtain a fresh air amount conversion value, the conversion coefficient being calculated in accordance with at least a correction term relating to a temperature within the intake system; a section for determining a total gas amount in accordance with the fresh air amount conversion value and one of an intake air and an target intake air amount; a section for determining a total opening area of the throttle valve and an EGR valve in accordance with the total gas amount; and a section for dividing the total opening area into first and second opening areas according to a first ratio of the fresh air amount conversion value and the total gas amount and a second ratio of one of the intake air amount and the target intake air amount, so as to determine the first opening area for throttle valve and the second opening area for the EGR valve.

A fifth aspect of the present invention resides in an internal combustion engine comprising a fresh air amount metering valve disposed in an intake air passage. An EGR system is provided to control an amount of EGR gas recirculated from an exhaust gas passage to the intake air passage. The EGR system includes an EGR passage connecting the exhaust gas passage and the intake air passage, and an EGR valve disposed in the EGR passage. A control system is provided to control the EGR valve and the fresh air metering valve. The control system includes a section for calculating a fresh air amount conversion value of an amount of the EGR gas, the fresh air amount conversion value being an amount of fresh air to be introduced to the intake system through the EGR system in place of the amount of the EGR gas; and a section for controlling respective opening degrees of the throttle valve and the EGR valve in accordance with the fresh air amount conversion value.

A sixth aspect of the present invention resides in a method of controlling an internal combustion engine including an EGR system for fluidly connecting an intake air passage and an exhaust gas passage and for controlling an amount of EGR gas recirculated from the exhaust gas passage to the intake air passage. The method comprises the following steps: (a) calculating a fresh air amount conversion value of an amount of the EGR gas, the fresh air amount conversion value being an amount of fresh air to be introduced to the intake air passage through the EGR system in place of the amount of the EGR gas; and (b) controlling the EGR system in accordance with the fresh air amount conversion value.

BRIEF DESCRIPTION OF DRAWINGS

In the drawings, like reference numerals and characters designate like parts and elements throughout all figures, in which.

DETAILED DESCRIPTION OF THE INVENTION

Figure 1:
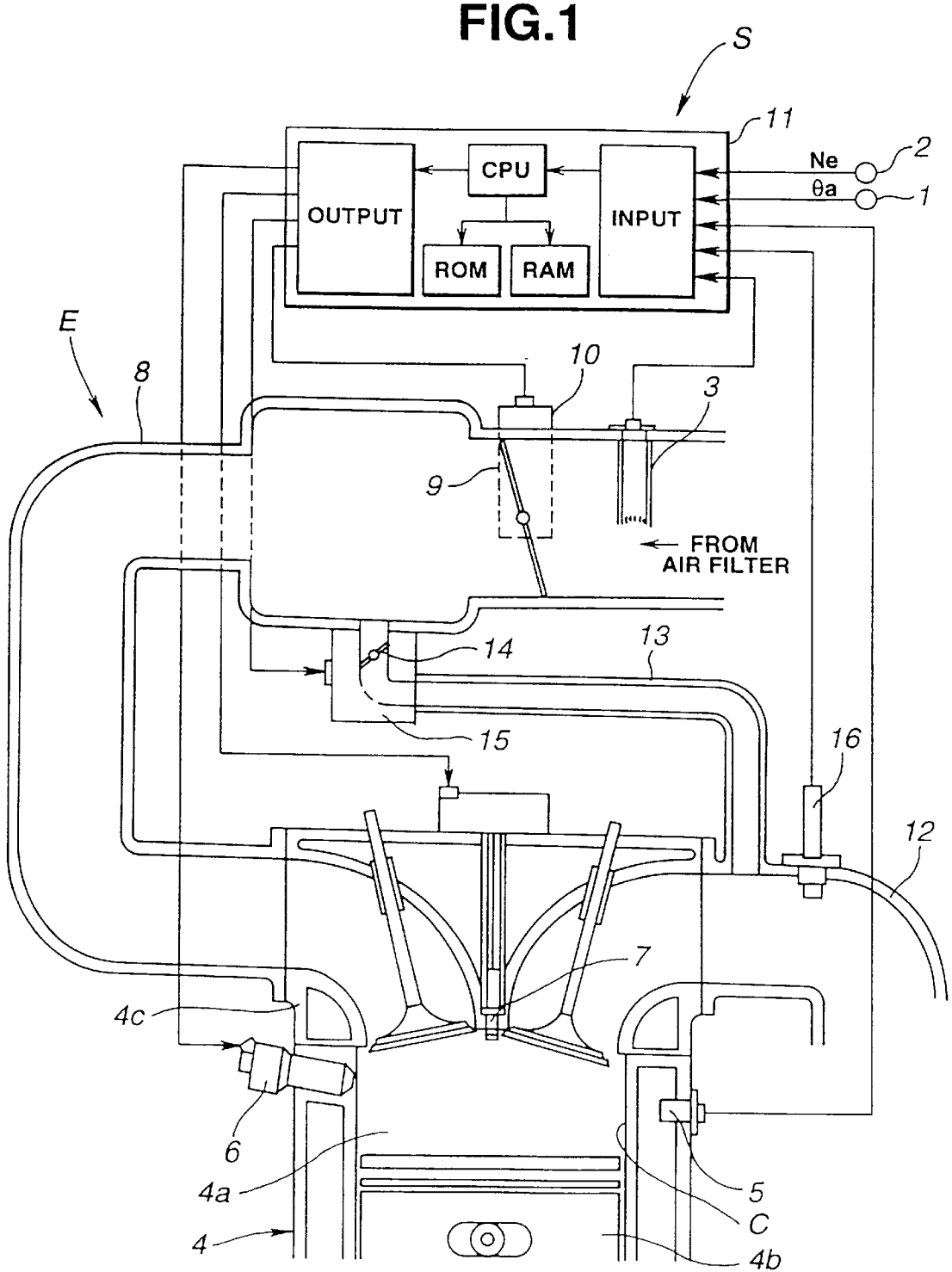
FIG. 1 is a schematic illustration of a first embodiment of an internal combustion engine according to the present invention.

Referring now to FIG. 1, a first embodiment of an internal combustion engine according to the present invention is illustrated by the reference E. The engine E is for an automotive vehicle and comprises an engine main body 4 having a plurality of cylinders C though only one cylinder C is shown. A combustion chamber 4a is defined in the cylinder C and between a piston 4b and a cylinder head 4c. The engine E further comprises a control system S which includes an accelerator operation amount sensor 1 for detecting an operation amount (θa) of an accelerator (not shown) operated by a driver (not shown). The accelerator operation amount (θa) corresponds to an engine load or torque required by the operator. The control system S further includes a crank angle sensor 2 forming part of an engine operating condition detecting section (not shown). The crank angle sensor 2 is adapted to generate a position signal at each unit crank angle and a standard signal at a crank angle corresponding to each stroke of the piston in the cylinder C. An engine speed can be detected by measuring the number of the position signal generated per unit time, or by measuring the cycle of generation of the standard signal. An airflow meter 3 forming part of the engine operating condition detecting section is adapted to detect an intake air amount of the engine main body 4. The intake air amount is an amount of intake air to be supplied to the engine main body 4 per unit time. An engine coolant temperature sensor 5 forming part of the engine operating condition detecting section is adapted to detect a temperature of engine coolant in the engine main body 4.

The engine main body 4 is provided with a fuel injector valve 6 which is located to directly inject fuel into the combustion chamber 4a. The fuel injector valve 6 is operated to inject fuel in accordance with a fuel injection signal. A spark plug 7 is installed to the cylinder head 4c in such a manner that its tip end section (provided with electrodes) projects in the combustion chamber 4a. The spark plug 7 is adapted to ignite air-fuel mixture in the combustion chamber 4a. Such a cylinder direct injection system in which fuel is directly injected into the combustion chamber 4a from the fuel injector valve 6 makes it possible to accomplish so-called stratified charge combustion thereby achieving engine operation on a lean air-fuel mixture. This can variably control an air-fuel ratio of the air-fuel mixture to be supplied to the combustion chamber 4a, within a wide region.

The engine main body 4 is provided with an intake air passage 8 through which intake air to be introduced into the cylinders C flows. The intake air passage 8 forms part of an intake system (not identified) of the engine E. A throttle valve 9 is disposed in the intake air passage 8. The opening degree of the throttle valve 9 is electronically controlled through a DC motor or the like by a throttle valve control device 10. The throttle valve 9 constitutes a fresh air amount metering valve for controlling a fresh air amount which is an amount of air without EGR gas or exhaust gas.

Each of the above-described sensors is adapted to output electrical signal representative of a sensed matter or engine operating condition. Such signals from the sensors are input to an electronic control unit 11. In accordance with an engine operating condition detected according to the signals from the sensors, the control unit 11 is arranged to generate a throttle valve control (driving) signal to be supplied to the throttle valve control device 10, the fuel injection signal to be supplied to the fuel injector valve 6, and an ignition signal to be supplied to the spark plug 7. The throttle control signal controls the opening degree of the throttle valve 9. The fuel injection signal controls a fuel injection amount (or an amount of fuel to be injected into the cylinders C from the fuel injector valve 6) of the fuel injector valve 6. The ignition signal controls the spark plug 7 in such a manner to set a spark timing of the spark plug 7 and to generate spark at the spark timing thereby to ignite air-fuel mixture in the combustion chamber 4a.

The engine main body 4 is further provided with an exhaust gas passage 12 through which exhaust gas from the cylinders C flows to be discharged out of the engine E. The exhaust gas passage 12 forms part of an exhaust system (not identified) of the engine E. An EGR (Exhaust Gas Recirculation) valve 14 forming part of an EGR system (not identified) is disposed in an EGR passage 13 which connects the exhaust gas passage 12 and the intake air passage 8. The opening degree of the EGR valve 14 is electronically controlled through a step motor or the like by an EGR control device 15.

Under the action of the control unit 11, a target intake air amount Qa is calculated in accordance with the accelerator operation amount θa and the engine speed Ne as discussed after. The opening degree of the throttle valve 9 is controlled in accordance with the throttle valve control (driving) signal supplied to the throttle valve control device 10, in which the throttle valve control signal regulates the opening degree of the throttle valve 9 so as to obtain the target intake air amount Qa. Additionally, exhaust gas recirculation (EGR) is accomplished in a predetermined engine operating region which is represented by an engine load and the engine speed Ne. The engine load is represented by the accelerator operation amount θa, a fuel injection amount (or an amount of fuel to be injected from the fuel injector valve 6 or the like. During the exhaust gas recirculation in which EGR gas (or exhaust gas) is recirculated back to the intake air passage 8, the control unit 11 outputs such an EGR control (driving) signal as to obtain a target EGR rate Regr (an EGR gas amount/the intake air amount), to the EGR control device 15 thereby controlling the opening degree of the EGR valve 14. The EGR gas amount is an amount of exhaust gas recirculated back to the intake air passage 8.

An air-fuel ratio sensor 16 is disposed in the exhaust gas passage 12 to detect the concentration of a particular component (such as oxygen) of exhaust gas thereby obtaining an air-fuel ratio of air-fuel mixture supplied to the cylinders C.

Subsequently, operation of the engine E will be discussed hereinafter with reference to FIG. 3 which shows a flowchart of the main routine of an intake control including a control of fresh air and a control of the EGR gas.

At a step S1, the accelerator operation amount θa and the engine speed Ne detected by the sensors are input to the control unit 11.

At a step S2, the target intake air amount Qa and the target EGR rate Regr are calculated in accordance with the detected accelerator operation amount θa and the engine speed Ne.

At a step S3, a target EGR gas amount Qegr (or a target amount of EGR gas recirculated back to the intake air passage 8) is controlled in accordance with the target intake air amount Qa and the target EGR rate Regr.

At a step S4, the target EGR gas amount Qegr is converted into the fresh air amount to obtain a fresh air amount conversion value [Qegr]a by introducing fresh air in place of the EGR gas. In other words, the fresh air amount conversion value corresponds to an amount of fresh air to be introduced into the intake air passage 8 through the EGR valve 14 in place of EGR gas (exhaust gas) on the assumption that the fresh air is introduced into the intake air passage 8 through the EGR valve 14. More specifically, a fresh air amount conversion value [Qegr]a is calculated by multiplying the target EGR gas amount Qegr by a fresh air amount conversion coefficient KQEGA which is calculated by a separate routine which will be discussed after.

At a step S5, a total gas amount upon the fresh air conversion is calculated by adding the target intake air amount Qa and the fresh air amount conversion value [Qegr]a.

At a step S6, a total opening area Agas corresponding to the total gas amount (Qa+[Qegr]a) is calculated.

The total opening area Agas which is required to allow the fresh air in the fresh air amount Qa and the EGR gas in the EGR gas amount Qegr to pass through the throttle valve and the EGR valve is given by the following equation:

$$Agas = Aath + Aev = \frac{Qa}{\rho ath \cdot Vath} + \frac{Qegr}{\rho ev \cdot Vev}$$

where Aath is an opening area of the throttle valve 9; Aev is an opening area of the EGR valve 14; ρath is a density of fresh air passing through the throttle valve; Vath is a flow speed of the fresh air; ρev is a gas density of EGR gas passing through the EGR valve; and Vev is a flow speed of the EGR gas.

The fresh air amount conversion value [Qegr]a of EGR gas flowing the EGR valve having the opening area Aev is given by the following equation:

$$[Qegr]a = Aev \cdot \rho ath \cdot Vath = \frac{\rho ath \cdot Vath}{\rho ath \cdot Vev} Qegr$$

Accordingly, the total opening area Agas is represented by the fresh air amount Qa and the fresh air amount conversion value [Qegr]a as follows:

$$Agas = \frac{Qa + [Qegr]a}{\rho ath \cdot Vath}$$

At a step S7, the total opening area Agas is divided into an opening area Aath of the throttle valve 9 and an opening area Aev of the EGR valve 14 in accordance with a ratio between the target intake air amount Qa and the fresh air amount conversion value [Qegr]a of the target EGR gas amount, as represented by the following equations:

$$Aath = \frac{Qa}{Qa + [Qegr]a} Agas$$

$$Aev = \frac{[Qegr]a}{Qa + [Qegr]a} Agas$$

At a step S8, the opening degree of the throttle valve 9 is controlled in accordance with the throttle valve opening area Aath under the action of the throttle valve control device 10. Additionally, the opening degree of the EGR valve 14 is controlled in accordance with the EGR valve opening area Aev under the action of the EGR valve control device 15.

Figure 2:
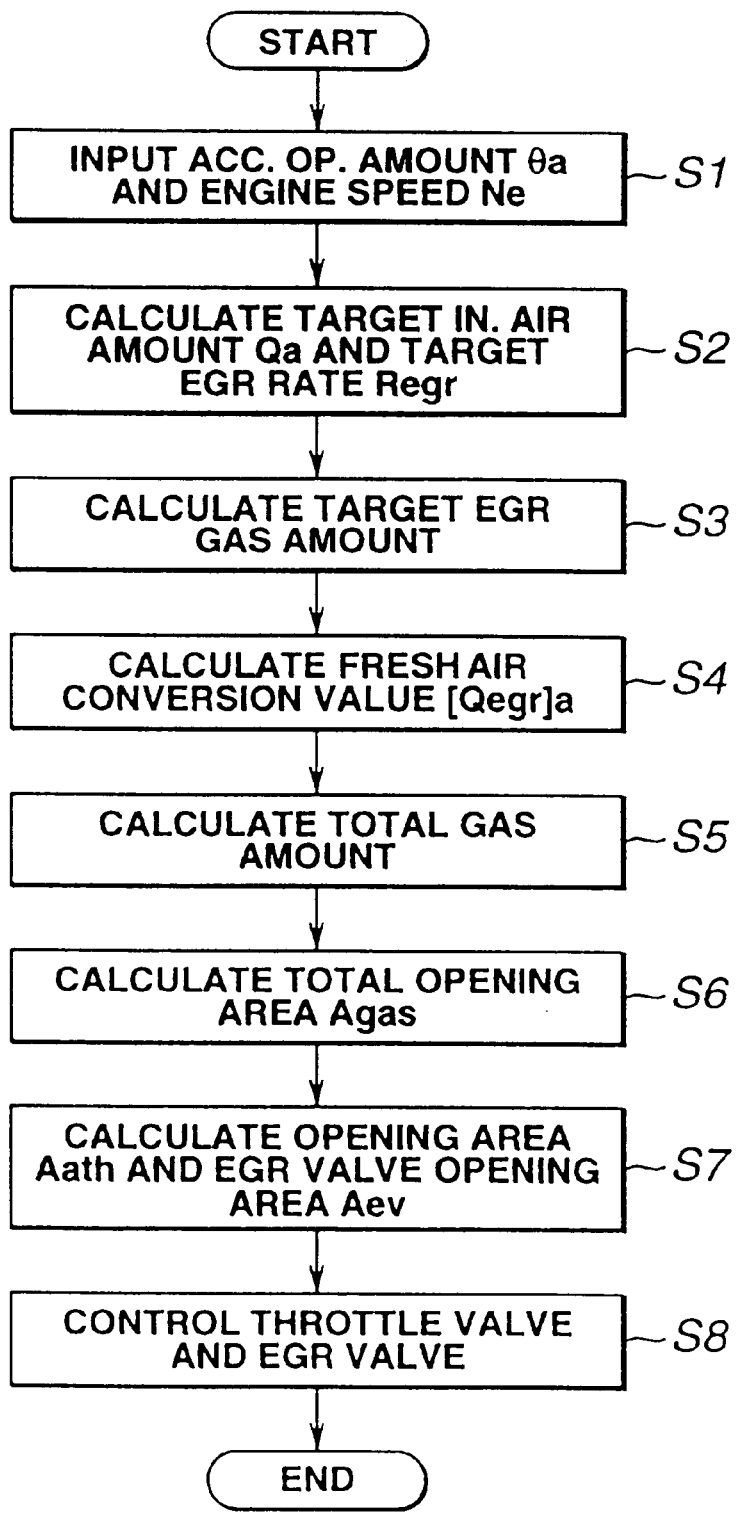
FIG. 2 is a flowchart of a control routine for a throttle valve and an EGR valve in the engine of FIG. 1.
Figure 3:
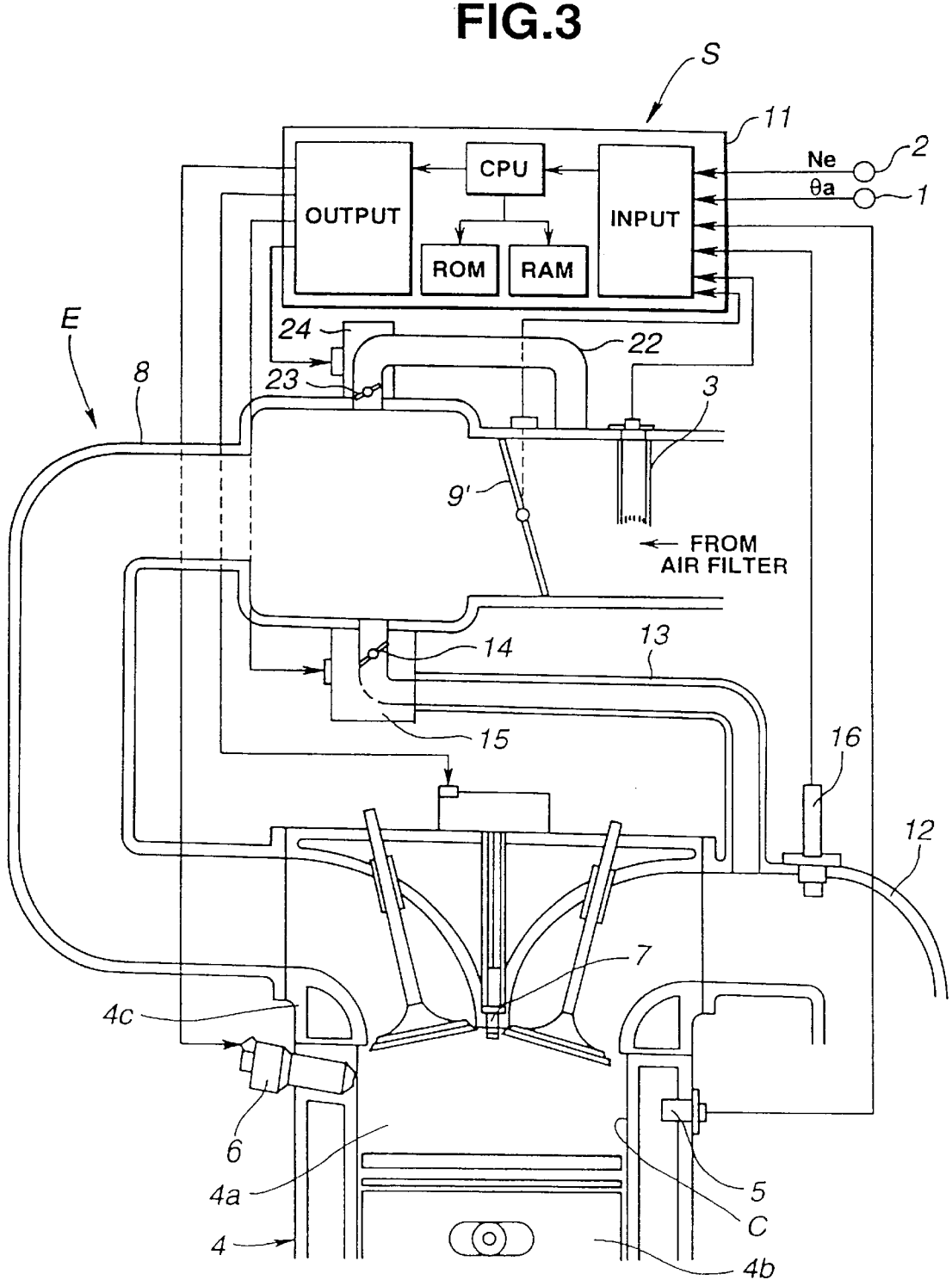
FIG. 3 is a schematic illustration similar to FIG. 1 but showing a second embodiment of the engine according to the present invention.

FIG. 3 illustrates a second embodiment of the engine E according to the present invention, which is similar to the first embodiment of FIGS. 1 and 2 with the exception that a throttle valve 9' is non-electronically controlled or mechanically controlled in relation to an accelerator (not shown) operated by the driver.

In this embodiment, the throttle valve 9' is operated in response to operation of the accelerator. A throttle valve opening degree sensor 21 is provided to detect a throttle valve opening degree TVO (or the opening degree of the throttle valve 9') and to output a throttle valve opening degree signal representative of the opening degree, to the control unit 11. Additionally, an auxiliary air passage 22 is provided bypassing the throttle valve 9' so as to connect the upstream and downstream sides of the throttle valve 9' in the intake passage 8. An auxiliary air control valve 23 is disposed in the auxiliary air passage 22 and controllably operated by the auxiliary air valve control device 24, in accordance with a driving signal input from the control unit 11.

During idling operation of the engine E, the auxiliary air control valve 23 is operated to control an amount of air (or auxiliary air amount) flowing through the auxiliary air passage 22, thereby accomplishing a usual idling engine speed control in which the engine speed is feedback-controlled to a target engine speed. Additionally, in this embodiment, the target intake air amount Qa is set in accordance with the throttle valve opening degree TVO and the engine speed Ne. The intake air amount Qa can be controlled to compensate a shortage amount of the intake air amount of intake air flowing through the throttle valve 9' relative to the target intake air amount Qa, with the auxiliary air amount.

Subsequently, operation of the engine E of this embodiment will be discussed hereinafter with reference to FIG. 5 which shows a flowchart of the main routine of an intake control including a control of fresh air and a control for EGR gas.

At a step S1A, the throttle valve opening degree TVO and the engine speed Ne are input to the control unit 11.

At a step S2A, the target intake air amount Qa and the target EGR rate Regr are calculated in accordance with the detected throttle valve opening degree TVO and engine speed Ne.

At a step S3A, the target EGR gas amount (or the amount of EGR gas recirculated back to the intake air passage 8) is controlled in accordance with the target intake air amount Qa and the target EGR rate Regr.

valve 23 having the opening area Aev is given by the following equation:

$$Qegr = Aev \cdot \rho ev \cdot Vev$$

where ρev is a gas density of EGR gas passing through the EGR valve; and Vev is a flow speed of the EGR gas.

The fresh air amount conversion value [Qegr]a of the EGR gas flowing through the EGR valve 23 having the opening area Aev is given by the following equation:

$$[Qegr]a = Aev \cdot \rho ath \cdot Vath$$

where ρath is a density of fresh air passing through the throttle valve; and Vath is a flow speed of the fresh air.

Accordingly, the fresh air amount conversion coefficient KQEGA (=[Qegr]a/Qegr) is represented by Eq. (1).

$$KQEGA = \frac{\rho a0 \cdot \left(\frac{Path}{Pa0}\right)^{\frac{1}{\kappa a}} \sqrt{\frac{2 \cdot \kappa a}{\kappa a - 1} \frac{Pa0}{\rho a0}\left\{1 - \left(\frac{Path}{Pa0}\right)^{\frac{\kappa a - 1}{\kappa a}}\right\}}}{\rho e0 \cdot \left(\frac{Pev}{Pe0}\right)^{\frac{1}{\kappa e}} \sqrt{\frac{2 \cdot \kappa e}{\kappa e - 1} \frac{Pe0}{\rho e0}\left\{1 - \left(\frac{Pev}{Pe0}\right)^{\frac{\kappa e - 1}{\kappa e}}\right\}}}$$

$$= \underbrace{\underbrace{\sqrt{\frac{\kappa e - 1}{\kappa a - 1} \frac{\kappa a}{\kappa e}}}_{Kkp} \cdot \underbrace{\sqrt{\frac{Ma}{Me}}}_{Km} \cdot \underbrace{\sqrt{\frac{Te0}{Ta0}}}_{Kt}}_{KEGRSD} / \underbrace{\frac{Pe0}{Pa0}}_{Kp} \cdot \underbrace{\left(\frac{Pm}{Pa0}\right)^{\frac{1}{\kappa a}} \sqrt{1 - \left(\frac{Pm}{Pa0}\right)^{\frac{\kappa a - 1}{\kappa a}}}}_{Kpma} / \underbrace{\left(\frac{Pm}{Pe0}\right)^{\frac{1}{\kappa e}} \sqrt{1 - \left(\frac{Pm}{Pe0}\right)^{\frac{\kappa e - 1}{\kappa e}}}}_{Kpme}$$

Eq. (1)

At a step S4A, the target EGR gas amount Qegr is converted into the fresh air amount which is obtained by introducing fresh air in place of the EGR gas.

At a step S5A, the total gas amount upon the fresh air conversion is calculated by adding the target intake air amount Qa and the fresh air amount conversion value [Qegr]a.

At a step S6A, the total opening area Agas corresponding to the total gas amount (Qa+[Qegr]a) is calculated.

At a step S7A, the total opening area Agas is distributed into a total opening area Aa for induction of intake air in a fresh air amount and the opening area Aev of the EGR valve 14 in accordance with a ratio between the target intake air amount Qa and the fresh air amount conversion value [Qegr]a of the target EGR gas amount. The total opening area Aa is a sum of an opening area Atha of the throttle valve 9' for controlling the fresh air amount and an opening area Abpa of the auxiliary air control valve 23.

At a step S8A, the opening area Abpa of the auxiliary air control valve 23 is calculated by subtracting the throttle valve opening area Atha corresponding to the opening degree of the throttle valve 9' from the total opening area Aa for induction of the intake air in the fresh air amount.

At a step S9A, the opening degree of the auxiliary air control valve 23 is controlled in accordance with the opening degree Abpa of the auxiliary air control valve 23 under the action of the auxiliary air valve control device 24. Additionally, the opening degree of the EGR valve 14 is controlled in accordance with the EGR valve opening area Aev under the action of the EGR valve control device 15.

Next, calculation of the fresh air amount conversion coefficient KQEGA used in the control of the engine E in the first and second embodiments will be discussed with reference to FIG. 5.

Figure 5:
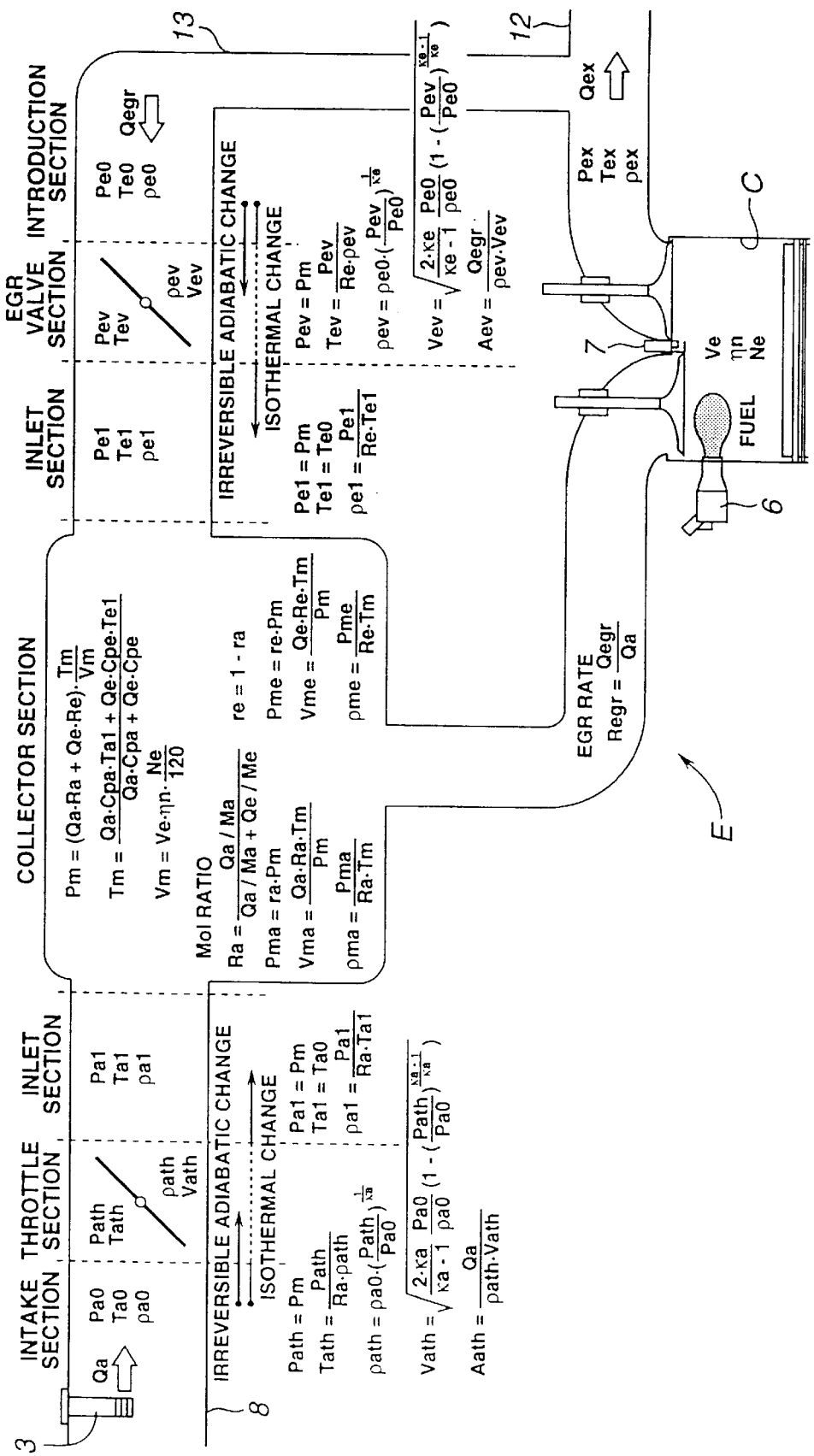
FIG. 5 is an illustration showing state change of fresh air and EGR gas in various sections in the engines of FIGS. 1 and 3.

In FIG. 5, gas state change of fresh air and EGR gas in various sections of the engine E are shown, in which the EGR gas amount Qegr of EGR gas flowing through the EGR where ρa0 is a density of air; ρe0 is a density of EGR gas; κa is a ratio of specific heat of fresh air; κe is a ratio of specific heat of EGR gas; CPa is a specific heat of fresh air; Cpe is a specific head of EGR gas; Ma is an average molecular weight of fresh air; Me is an average molecular weight of EGR gas; Ta0 is a temperature of fresh air; Te0 is a temperature of EGR gas; Tm is a gas temperature within the intake air passage; Pa0 is atmospheric pressure; Pe0 is a pressure of exhaust gas; Pm is a pressure within the intake air passage; Path is a pressure within a section (throttle valve section) where the throttle valve is disposed; Pev is a pressure within a section (EGR valve section) where the EGR valve is disposed; Kkp is a specific-heat ratio correction term; Km is a molecular weight correction term; Kt is a temperature correction term; Kp is a pressure correction term; Kpma is a fresh differential pressure correction term; and Kpme is an exhaust gas differential pressure correction term.

Figure 6:
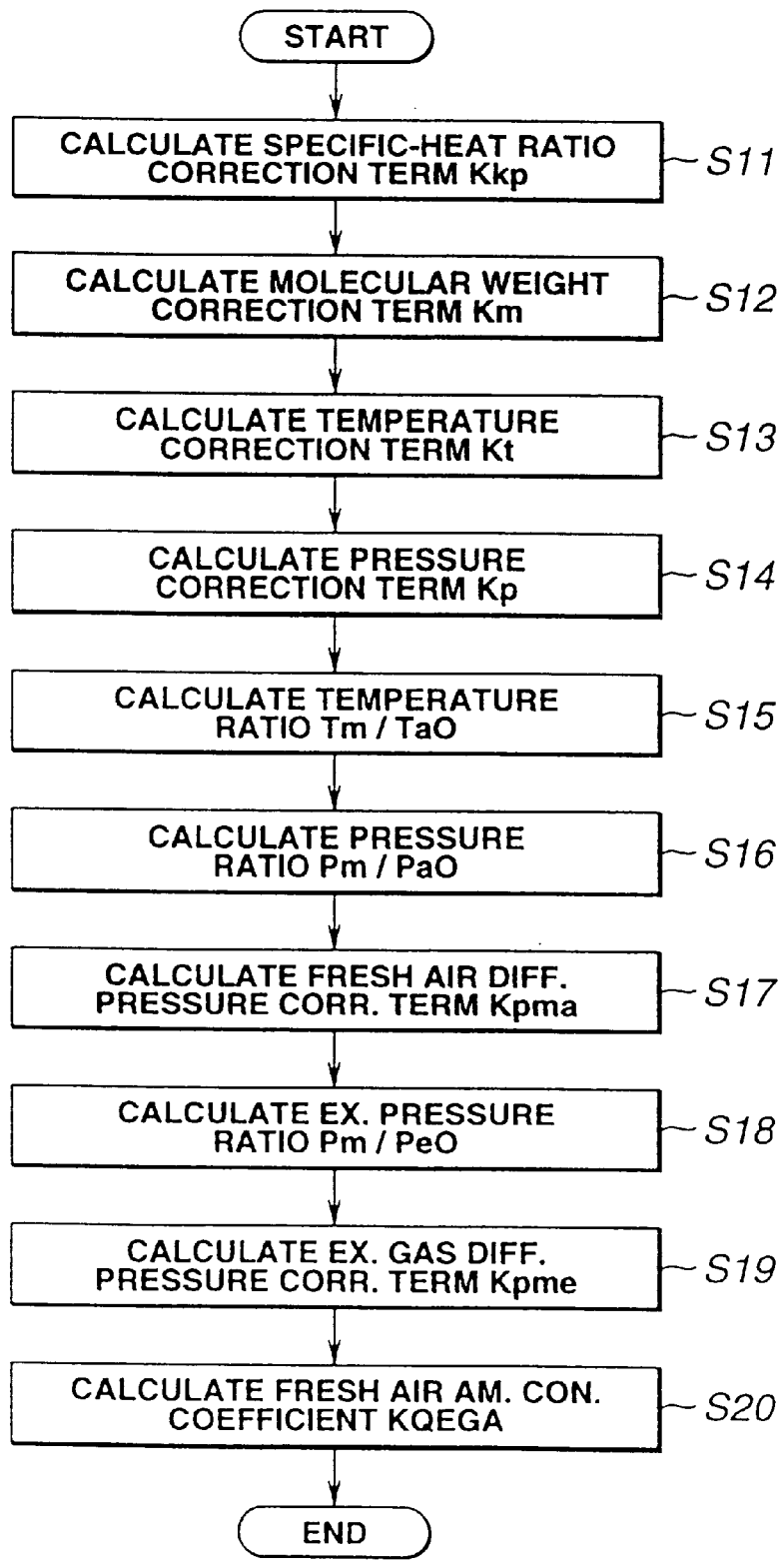
FIG. 6 is a flowchart of a routine for calculating a fresh air amount conversion value used in the control routine of FIGS. 2 and 4.

Hereinafter, calculation of the fresh air amount conversion coefficient KQEGA will be discussed in detail with reference to a flowchart of FIG. 6 and a block diagram of FIG. 7.

At a step S11, the specific-heat ratio correction term Kkp used in the above Eq. (1) is calculated (See a block "a" in FIG. 7). Here, the specific-heat ratio κa of air is a constant value of 1.4. The specific-heat ratio Ke of EGR gas (exhaust gas) takes a value within a range of from 1.33 to 1.40 in accordance with temperature and an excess fresh air factor λa (or excess air factor λ=Quantity of air supplied/Theoretical requirement); however, calculation here is made on the assumption that the specific-heat ratio is 1.36 and constant. This is because the variation range of the specific-heat ratio is small and therefore error will be narrow on the assumption that the specific-heat ratio is a middle value in the above range and constant.

Figure 7:
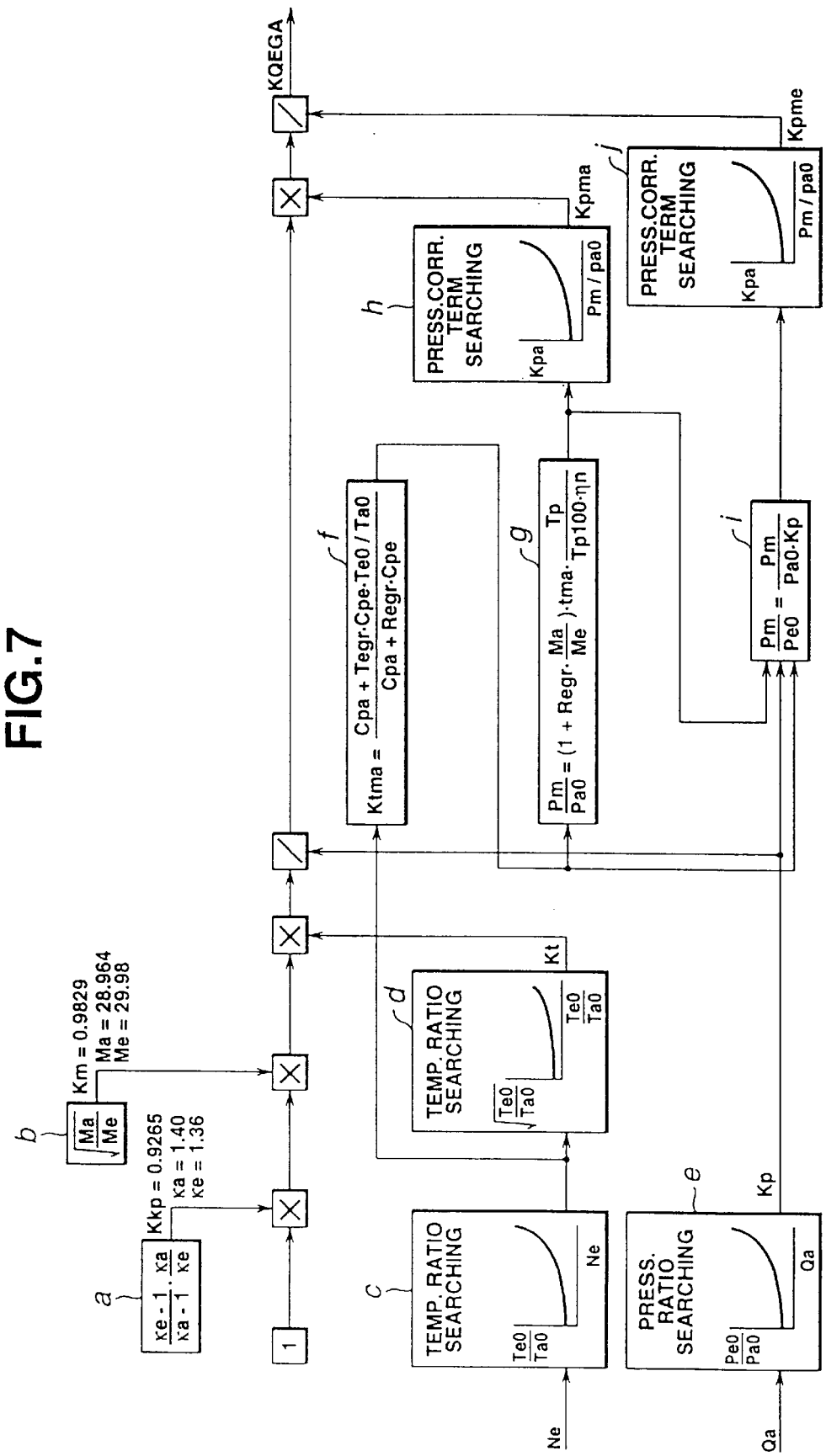
FIG. 7 is a block diagram showing a process for calculation of the fresh air amount conversion value used in the control routine of FIGS. 2 and 4.

At a step S12, the molecular weight correction term is calculated (See a block "b" in FIG. 7). Here, air takes a molecular weight Ma which is 28.964 and constant. EGR gas takes a molecular weight Me which is within a range of from 29.2 to 30.4 in accordance with the excess fresh air ratio λa which causes a gas composition to vary; however, calculation is made on the assumption that the molecular weight Me is 29.5 and constant. This is because the variation range of the molecular weight of EGR gas is narrow and therefore error will be small on the assumption that the specific-heat ratio is a middle value in the above range and constant.

At a step S13, the temperature correction term Kt is calculated. More specifically, an exhaust gas temperature ratio (TeO/TaO) of the exhaust gas temperature TeO relative to the (standard) fresh air temperature TaO is determined, for example, by searching a table or a map which has been prepared in accordance with experimentally obtained data in terms of engine speeds (See a block "c" in FIG. 7). Subsequently, the square root of the above exhaust gas temperature ratio (TeO/TaO) is determined by searching a table or a map, or by calculation (See a block "d" in FIG. 7).

At a step S14, the pressure correction term Kp is calculated. More specifically, an exhaust pressure temperature ratio (PeO/PaO) of the exhaust gas pressure PeO relative to the (standard) fresh air pressure (atmospheric pressure) PaO is determined, for example, by searching a table or a map which has been prepared in accordance with experimentally obtained data in terms of the intake air amount Qa (See a block "e" in FIG. 7). It is to be noted that the target intake air amount or a detection value by the airflow meter is used as the intake air amount Qa used in the table or the map.

After the step S14, the fresh air differential pressure correction term Kpma and the exhaust gas differential pressure correction term Kpme will be calculated.

Here, in order to accomplish the calculation of the above differential pressure correction terms, the temperature Tm and pressure Pm within the intake air passage (or an intake system) are determined. It is to be noted that the temperature Tm is equal to the pressure Path at the throttle valve section and equal to the pressure Pev at the EGR valve section. The temperature Tm within the intake air passage is determined according to the enthalpy of fresh air and EGR gas (exhaust gas). At a step S15, a temperature ratio Ktma (=Tm/TaO) of the gas temperature Tm within the intake air passage relative to the temperature TaO of fresh air is calculated by Eq. (2) (See a block "f" in FIG. 7).

$$Ktma = \frac{Tm}{TaO} = \frac{Cpa + Regr \cdot Cpe \cdot TeO/TaO}{Cpa + Regr \cdot Cpe} \quad \text{Eq. (2)}$$

where Cpa is a specific heat of fresh air; Cpe is a specific heat of exhaust gas; and Regr is the EGR rate. The exhaust gas temperature ratio determined in the step S13 is used as the temperature ratio (TeO/TaO).

Subsequently, at a step S16, a fresh air pressure ratio (Pm/PaO) is calculated (See a block "g" in FIG. 7). More specifically, first, the pressure Pm within the intake air passage is calculated by using an equation of state, according to Eq. (3).

$$Pm = \left(1 + Regr \cdot \frac{Re}{Ra}\right) \cdot \frac{Ra \cdot Qa \cdot Tm}{Vm} \quad \text{Eq. (3)}$$
$$= \left(1 + Regr \cdot \frac{Re}{Ra}\right) \cdot \frac{Qacyl \cdot Ra \cdot TaO}{PaO \cdot Vecyl \cdot \eta n} \cdot PaO \cdot \frac{Tm}{TaO}$$

where Ra is a gas constant of fresh air; Re is a gas constant of exhaust gas; ηn is a charging efficiency of intake air (fresh air+EGR gas); Qacyl is a (sucked) fresh air amount per one cycle of a cylinder C; and Vecyl is a (sucked) volume per one cycle of the cylinder C.

Accordingly, the fresh pressure ratio (Pm/PaO) is calculated by Eq. (4).

$$\frac{Pm}{PaO} = \left(1 + Regr \cdot \frac{Re}{Ra}\right) \cdot Ktma \cdot \frac{Tp}{Tp100 \cdot \eta n} \quad \text{Eq. (4)}$$

where Ra is the gas constant of fresh air; Re is the gas constant of exhaust gas; ηn is the charging efficiency of intake air (fresh air+EGR gas); and Tp100 is a standard pulse width corresponding to an intake air amount at a charging efficiency of 100%. In this regard, assuming that the intake air amount Qacyl0, Qacyl0=PaO·Vecyl/(Ra·TaO). Actual intake air amount Qacyl can be substituted with the standard pulse width Tp. Similarly, Qacyl can be substituted with Tp100. Here, the final term of the right member represents the rate of fresh air.

At a step S17, the fresh air differential pressure correction term Kpma is calculated by using the above fresh air pressure ratio Pm/PaO (See a block "h" in FIG. 7).

At a step S18, the exhaust gas pressure ratio Pm/PeO is calculated by dividing the above fresh air pressure ratio Pm/PaO by Kp (=PeO/PaO) (See a block "i" in FIG. 7).

At a step S19, the exhaust gas differential pressure correction term Kpme is calculated by using the above exhaust gas pressure ratio Pm/PeO (See a block "j" in FIG. 7).

At a step S20, the fresh air amount conversion coefficient KQEGA is calculated by multiplying the above-determined respective correction terms by each other.

Otherwise, the fresh air conversion efficiency KQEGA may be determined by searching a data map of the fresh air amount conversion efficiency KQEGA in terms of engine operating conditions, prepared by using theoretical formula of the fresh air amount conversion efficiency KQEGA. More specifically, the fresh air amount conversion efficiency KQEGA can be determined in accordance with the intake air amount Qa, the engine speed Ne and the EGR rate, and therefore a map whose parameter is EGR rate is prepared in accordance with the intake air amount Qa and the engine speed Ne.

Figure 8:
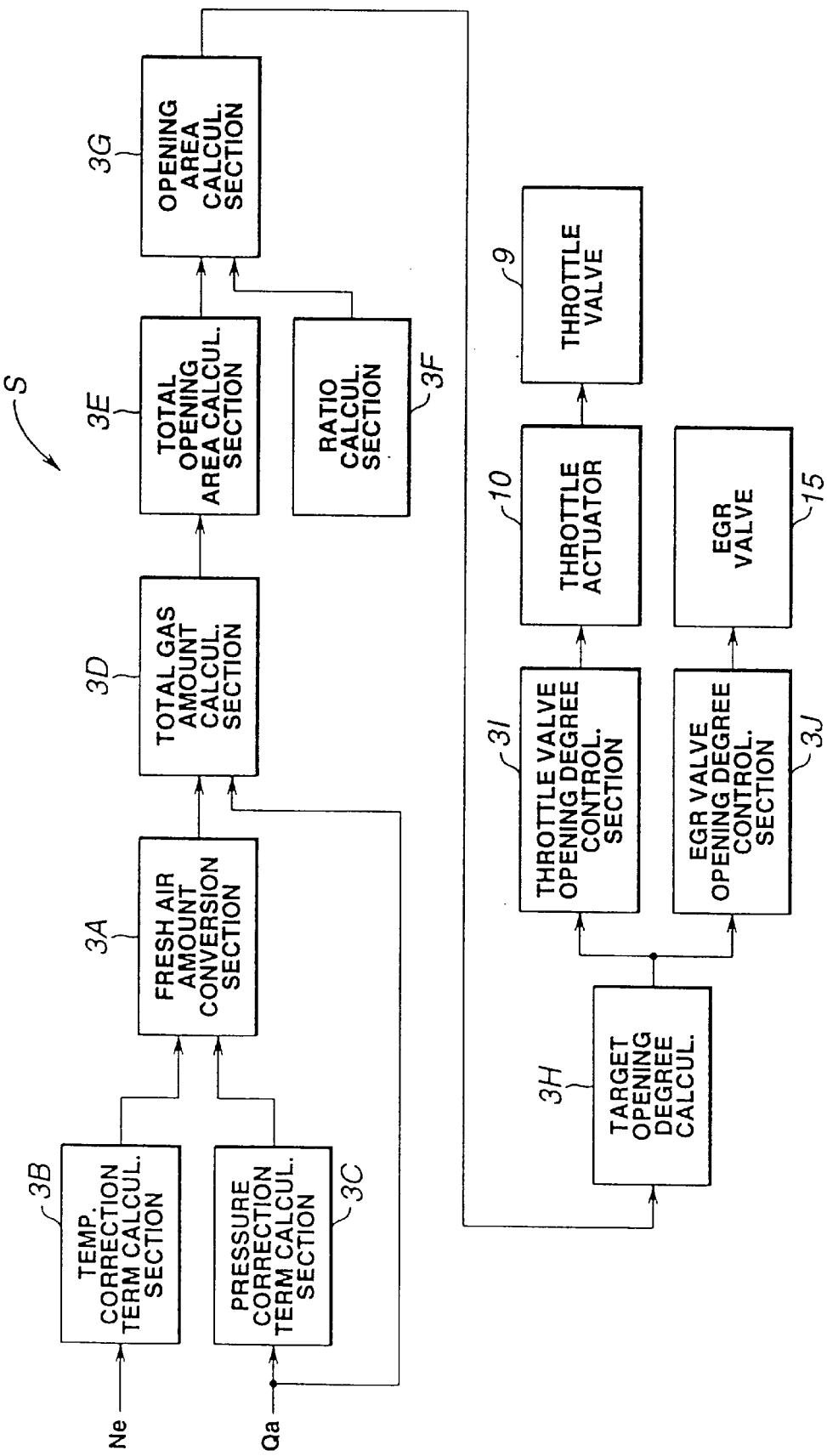
FIG. 8 is a block diagram showing a functional structure of a third embodiment of the engine according to the present invention.
Figure 9:
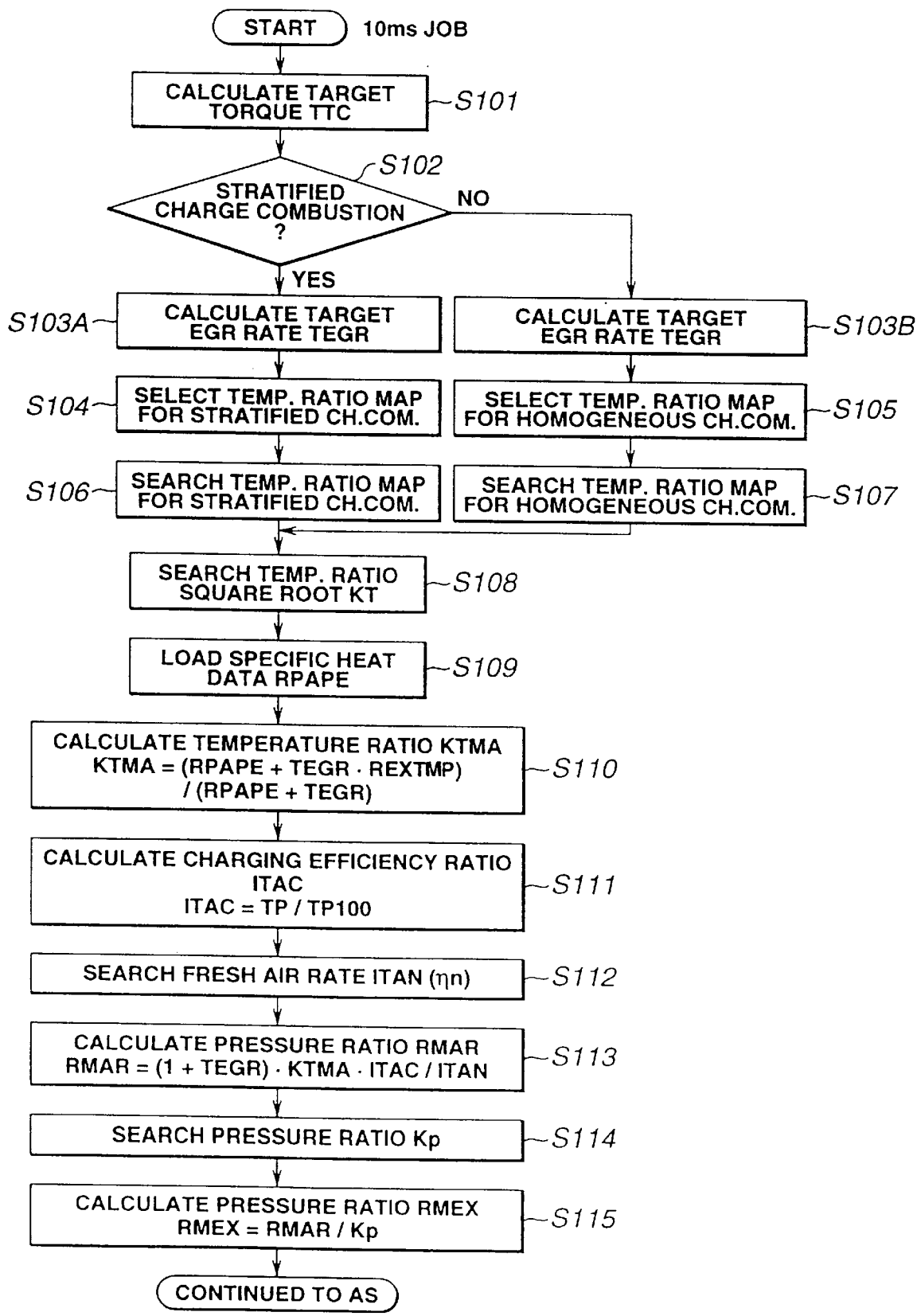
FIGS. 9 and 10 is a flowchart showing a control routine for calculating a target opening degree of a throttle valve and an EGR valve in the engine of FIG. 8.
Figure 10:
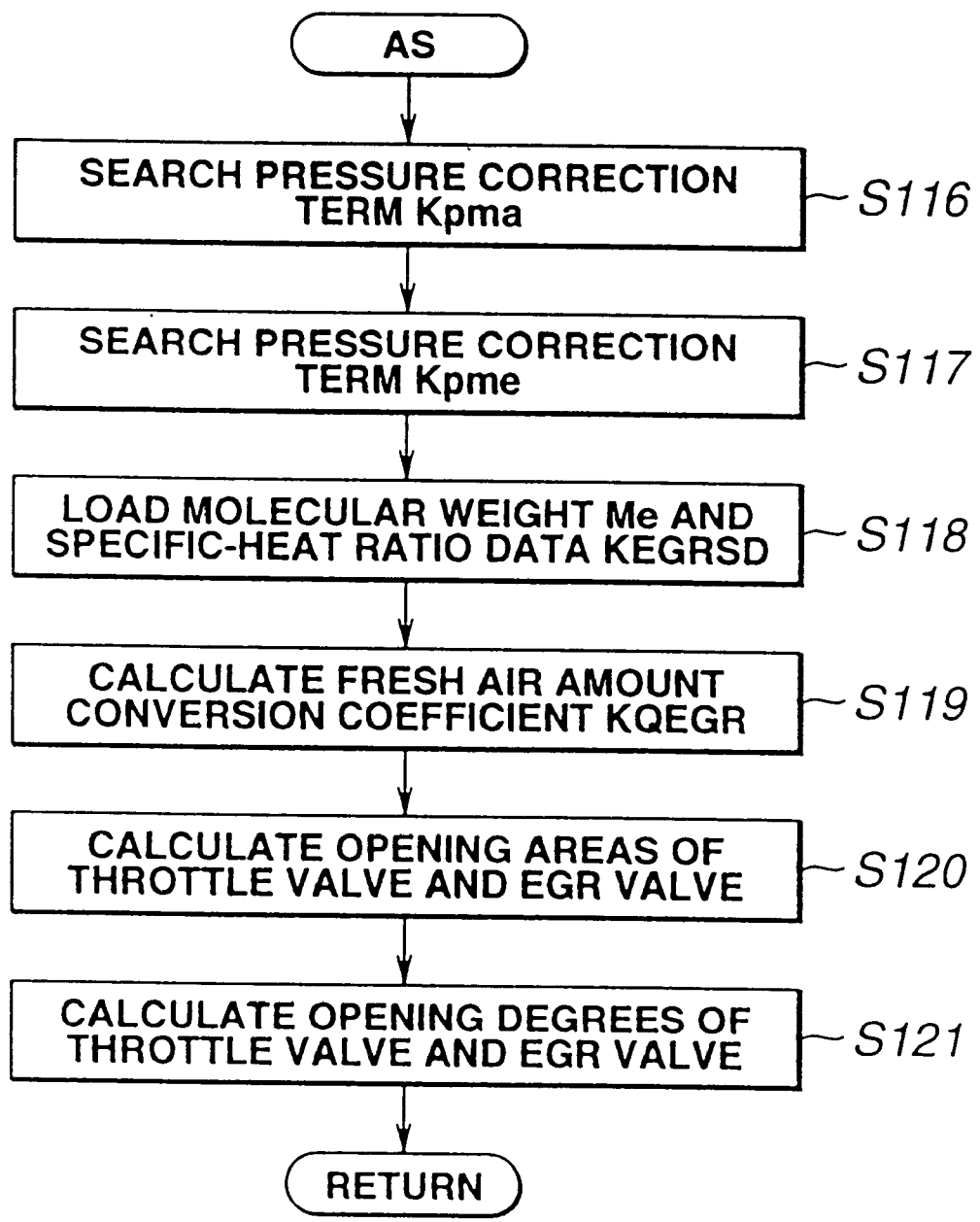

FIGS. 8 to 10 illustrate a third embodiment of the engine E according to the present invention, which is similar to that of the first embodiment in FIG. 1. In this embodiment, during a low and medium load engine operating range, fuel is injected from the fuel injector vale 6 into the combustion chamber 4a in compression stroke of each cylinder C, thereby forming layers of combustible mixture around the spark plug 7 so as to accomplish stratified charge combustion in which fuel concentration distribution is non-homogenous. In a high load engine operating range, fuel is injected from the fuel injector valve 6 into the combustion chamber 4a in intake stroke of each cylinder C thereby forming generally homogeneous air-fuel mixture in the combustion chamber 4 so as to accomplish homogeneous charge combustion in which fuel concentration distribution is homogeneous.

In this embodiment, control of EGR gas is accomplished in accordance with control signals from the control unit 11. More specifically, the control of EGR gas is accomplished during the above stratified charge combustion, and inhibited during homogeneous lean charge combustion which is changed-over from the stratified charge combustion; however, the control of EGR gas is accomplished during the homogeneous charge combustion under a feedback air-fuel ratio control at stoichiometric air-fuel ratio.

Function of the control unit 11 in the control system S of this embodiment will be discussed with reference to FIG. 8. The control unit 11 is arranged to accomplish a torque demand control in which the opening degree of the throttle valve 9 is regulated to obtain a target torque which has been set in accordance with the operation amount of the accelerator, the engine speed and the like, in the engine provided with the electronically controlled throttle valve 9.

The control unit 11 comprises a fresh air amount conversion section 3A for converting an amount of the EGR gas into an amount of fresh air in accordance with a quantity of state of the EGR gas by using a fresh air amount conversion coefficient so as to obtain a fresh air amount conversion value. A temperature correction term calculating section 3B is provided to calculate a correction term relating to a temperature within the intake system, for the conversion coefficient, in accordance with at least the engine speed Ne. A pressure correction term calculating section 3C is provided to calculate a correction term relating to a pressure within the intake system, for the conversion coefficient, in accordance with at least the intake air amount Qa. A total gas amount calculating section 3D is provided to calculate a total gas amount to be supplied to the engine in accordance with a target intake air amount corresponding to a target air-fuel ratio and the fresh air amount conversion value of the EGR gas amount. Here, the target intake air amount may be determined by dividing a target basic intake air amount corresponding to a basic air-fuel ratio by a target equivalent ratio, in which the target basic intake air amount is determined in accordance with the accelerator operation amount and the engine speed.

A total opening area calculating section 3E is provided to calculate a total opening area for the throttle valve 9 and the EGR valve 14, in accordance with the total gas amount. A ratio calculating section 3F is provided to calculate a first ratio of the fresh air amount conversion value of the EGR gas amount and the total gas amount and a second ratio of the intake air amount and the total gas amount. An opening area calculating section 3G is provided to calculate respective opening areas of the throttle valve 9 and the EGR valve 14 by dividing the total opening area in accordance with the first and second ratios. A target opening degree calculating section 3H is provided to calculate respective target opening degrees of the throttle valve 9 and the EGR valve 14 in accordance with the respective opening areas. A throttle valve opening degree controlling section 3I is provided to control the throttle valve operating section (throttle actuator or throttle valve control device 10) in a manner that the throttle valve takes the target opening degree which has been calculated. Additionally, an EGR valve opening degree controlling section 3J is provided to control the EGR valve in a manner that the EGR valve takes the target opening degree which has been calculated.

Subsequently, the concrete function of the above fresh air amount conversion section 3A, the temperature correction term calculation section 3B and the pressure correction term calculation section 3C will be discussed.

The calculating function for the fresh air amount conversion coefficient KQEGA and the calculating function for the target opening degrees of the throttle valve 9 and the EGR valve 14 will be discussed with reference to flowcharts of FIGS. 9 and 10 and a block diagram of FIG. 11. Here, the fresh air amount conversion coefficient KQEGA is calculated by the theoretical equation Eq. (1) in connection with the first embodiment.

At a step S101, a target torque TTC is calculated in accordance with the accelerator operation amount θa detected by the accelerator operation amount sensor 1 and the engine speed Ne detected by the crank angle sensor 2.

At a step S102, a decision is made as to which of the stratified charge combustion and the homogeneous charge combustion is made in each cylinder C. In case of the stratified charge combustion, a target EGR rate TEGR is calculated at a step S103A. In case of the homogenous charge combustion, the target TEGR is calculated at a step S103B.

Figure 12:
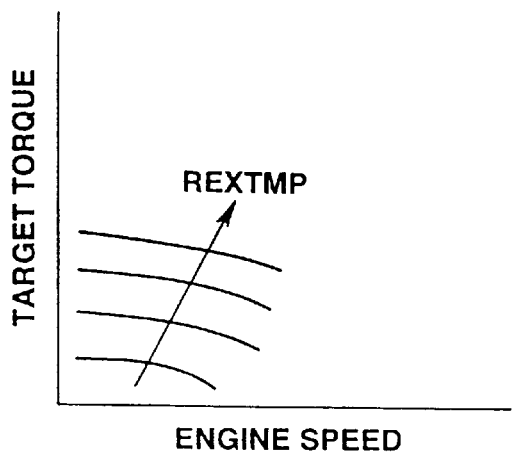
FIG. 12 is a map of a temperature ratio for stratified charge combustion, used in the control routine of FIGS. 9 and 10.

At a step S104, a map (shown in FIG. 12) of a temperature ratio REXTMP (between exhaust gas and fresh air) is changed-over to one for stratified charge combustion. In other words, the map for stratified charge combustion is selected. Specifically, the temperature ratio is a ratio of exhaust gas absolute temperature relative to standard absolute temperature. In the map, the temperature ratio is represented in terms of engine speed and torque (the target torque).

Figure 13:
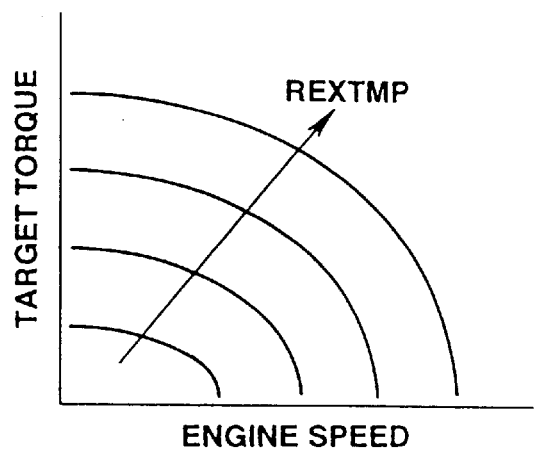
FIG. 13 is a map of a temperature ratio for homogeneous charge combustion, used in the control routine of FIGS. 9 and 10.

At a step S105, a map (shown in FIG. 13) of the temperature ratio REXTMP (between exhaust gas and fresh air) is changed-over to one for homogenous charge combustion. In other words, the map for homogeneous charge combustion is selected. In the map, the temperature ratio is mapped in terms of engine speed and torque (the target torque).

At a step S106, the temperature ratio REXTMP is searched in accordance with the engine speed and the target torque, with reference to the map (in FIG. 12) for stratified charge combustion. This is accomplished by a temperature ratio calculation section 3a in FIG. 11.

At a step S107, the temperature ratio REXTMP is searched in accordance with the engine speed and the target torque, with reference to the map (in FIG. 13) for homogeneous charge combustion. This is accomplished by a temperature ratio calculation section 3a in FIG. 11.

The reason why the changeover between the map for stratified charge combustion and the map for homogeneous charge combustion is accomplished is that temperature of exhaust gas changes in accordance with combustion condition (stratified charge combustion or homogeneous charge combustion) even at the same engine speed, target torque or pulse width TP corresponding to the intake air amount for the cylinder C, in an engine where air-fuel ratio changes throughout a wide range such as a cylinder direct injection internal combustion engine in which fuel is directly injected into the combustion chamber. Otherwise, only one map may be used in place of the maps in FIGS. 12 and 13, in which processing is made to correct a map searched value in accordance with combustion condition. Such an embodiment where this processing is made will be discussed after.

At a step S108, the square root Kt is searched in accordance with the temperature ratio with reference to a table for square root of the temperature ratio between the exhaust gas and the fresh air. This is accomplished by a temperature ratio square root calculation section 3b in FIG. 11.

At a step S109, data RPAPE (the fresh air specific heat Cpa/EGR gas specific heat CPe) is loaded.

Figure 11:
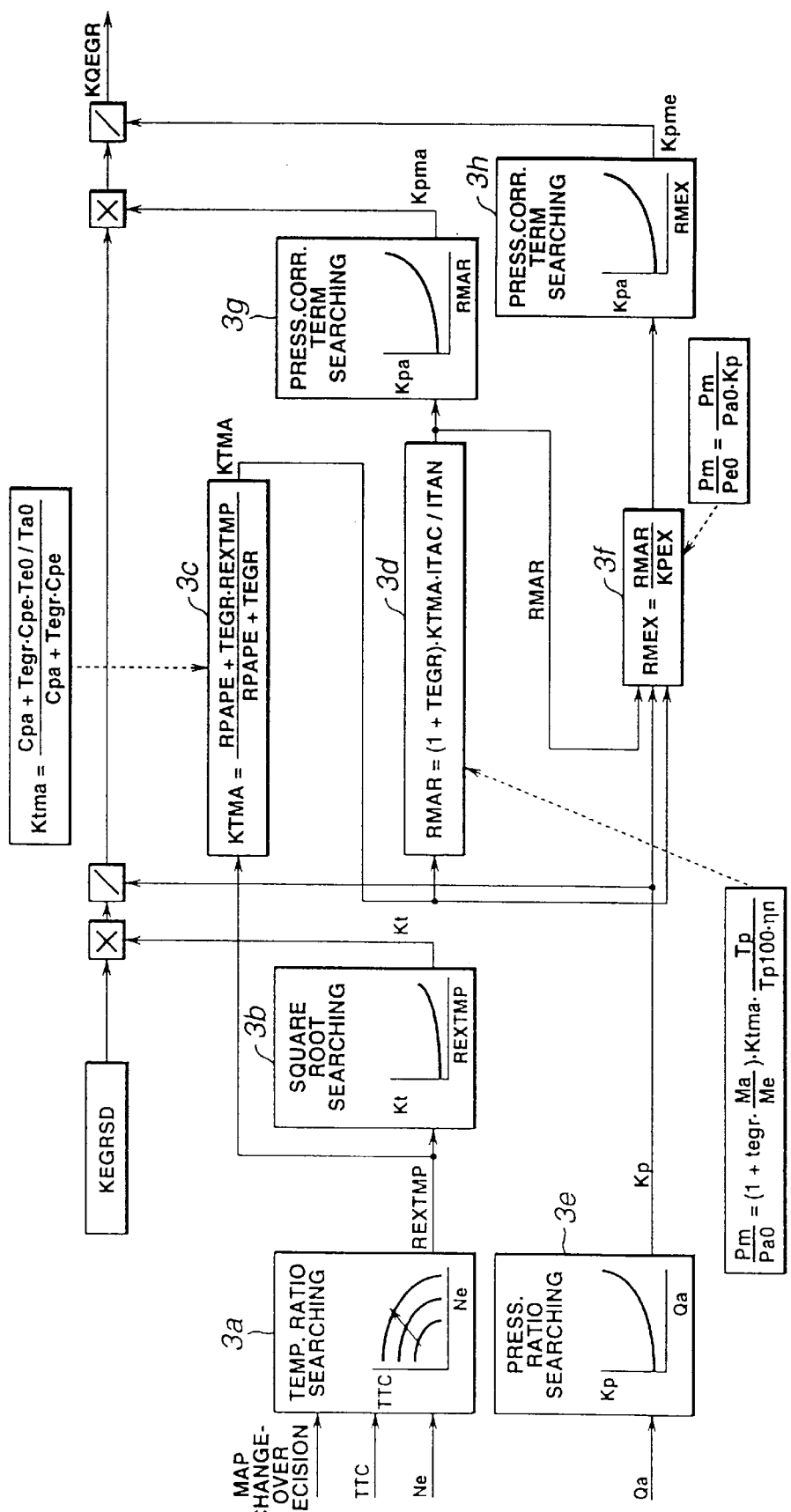
FIG. 11 is a block diagram showing a process for calculation of the fresh air amount conversion value used in the control routine of FIGS. 9 and 10.

At a step S110, a ratio (a temperature within an intake manifold/a temperature of fresh air) KTMA is calculated at an intake manifold temperature-fresh air temperature ratio calculation section 3c in FIG. 11, by the following equation:

$$KTMA = (RPAPE + TEGR \cdot REXTMP)/(RPAPE + TEGR)$$

At a step S111, calculation is made to obtain a charging efficiency ratio ITAC (=TP/TP100) which is a ratio between the pulse width TP (corresponding to the intake air amount) and TP100 (a pulse width corresponding to an amount of air at a charging efficiency of 100%) which has been previously set.

Figure 14:
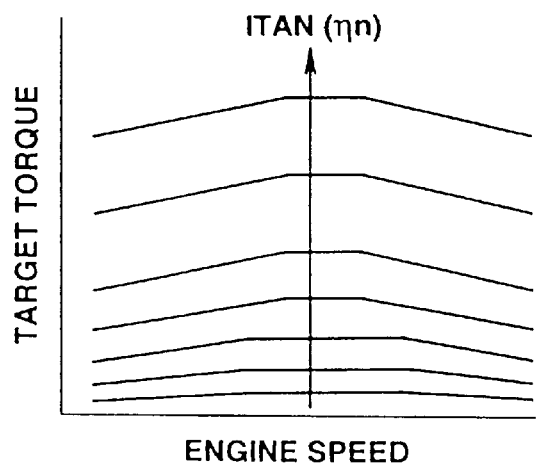
FIG. 14 is a map of a fresh air rate, used in the control routine of FIGS. 9 and 10.

At a step S112, a fresh air rate ITAN (ηn) is searched from a map shown in FIG. 14. The fresh air rate ITAN (ηn) is a ratio of a volume of fresh air in a state within the intake manifold relative to the stroke volume of the cylinder C. The map for the fresh air rate ITAN has been previously set in terms of the target torque and engine speed.

At a step S113, a ratio (pressure within the intake manifold/pressure of fresh air) RMAR is calculated at an intake manifold pressure-fresh air pressure ratio calculation section 3d in FIG. 11, by the following equation:

$$RMAR=(1+TEGR)\cdot KTMA\cdot ITAC/ITAN$$

At a step S114, a pressure ratio KP (between exhaust gas and fresh air) is searched in accordance with a signal Qa corresponding to an output value of the airflow meter 3 with reference to a map for the pressure ratio, at a pressure ratio calculation section 3e in FIG. 11.

At a step S115, a ratio RMEX (pressure within the intake manifold/pressure of exhaust gas) is calculated at a intake manifold pressure-exhaust pressure ratio calculation section 3f in FIG. 11, by the following equation:

$$RMEX=RMAR/Kp$$

At a step S116, a pressure correction Kpma is searched in accordance with the above RMAR with reference to a table for the pressure correction term, at a pressure correction term calculation section 3g in FIG. 11.

At a step S117, a pressure correction Kpme is searched in accordance with the above RMEX with reference to a table for the pressure correction term, at a pressure correction term calculation section 3h.

At a step S118, the average molecular weight Me of fresh air and the data KEGRSD (Kkp+Km) of the specific-heat ratios are loaded.

At a step S119, the fresh air amount conversion coefficient KQEGA is calculated by the following equation:

$$KQEGA=KEGRSD\cdot Kt\cdot Kpma/Kp/Kpme$$

The fresh air amount conversion coefficient KQEGA is to used for converting the amount of EGR gas into the amount of fresh air in accordance with quantity of state, as discussed above.

At a step S120, the amount of EGR gas recirculated back to the intake system is converted into the amount of fresh air in accordance with the above fresh air amount conversion coefficient KQEGA to obtain the fresh air amount conversion value for the EGR gas. Then, the total gas amount for the engine is calculated by adding the target intake air amount and the fresh air amount conversion value. Then, the total opening area for the throttle valve 9 and the EGR valve 14 is calculated corresponding to the total gas amount. Further, the total opening area is divided into the opening area of the throttle valve and the opening area of the EGR valve respectively in accordance with a ratio between the target intake air amount and the total gas amount and a ratio between the fresh air amount conversion value for the EGR gas and the total gas amount.

At a step 121, target opening degrees of the throttle valve 9 and the EGR valve 14 are calculated in accordance respective with the opening areas of throttle valve and the EGR valve.

The content of the control accomplished in this embodiment will be summarized hereinafter.

(a) The amount of EGR gas is converted into the amount of fresh air in accordance with the quantity of state of the EGR gas to obtain the fresh air amount conversion value for the EGR gas. Then, sum of this fresh air amount conversion value and the target intake air amount is determined.

(b) The sum is the total gas amount in case that the EGR gas is supposed to be air (i.e., whole gases are air). Then, the total opening area of the throttle valve and the EGR valve is determined.

(c) The total opening area is divided according respectively to the ratio of the fresh air amount conversion value and the total gas amount and the ratio of the target intake air amount and the total gas amount so as to determine the opening degrees of the throttle valve and the EGR valve.

(d) The conversion in (a) is carried out by using the fresh air amount conversion coefficient. The temperature correction term of the equation for calculation the fresh air amount conversion coefficient is determined in accordance with engine speed and combustion condition (stratified charge combustion or homogeneous charge combustion). Additionally, the pressure correction term of the same equation is determined in accordance with the output signal from the air flow meter or the like.

(e) The physical property values such as the specific-heat ratios, and the average molecular weights of fresh air and EGR gases change in accordance with temperature, gas composition and the like; however, such physical property values are approximated to a constant value.

In this case, the correction terms for the physical properties have been previously calculated, and are provided as the data KEGRSD and RPAPE (=CPa/CPe).

Additionally, in calculation of the pressure correction terms Kpma and Kpme (See Eq. (1)), the pressure correction terms KPMA and KPME are determined by making table-searching in accordance with RMAR and RMEX as explained with reference to FIG. 11 upon the specific-heat ratios of fresh air and EGR gas being set respectively at the constant values of κa and κe.

The thus arranged embodiment offers the following advantageous effects:

As discussed above, the condition (pressure and temperature) within the intake system changes in accordance with EGR gas, so that the amount of intake air is unavoidably changed in accordance with presence or absence of EGR and/or EGR rate on the assumption that the opening degree of the throttle valve is constant. As a result, according to conventional techniques, it has been impossible to accurately control the EGR rate, while causing a step-wise change of torque. Additionally, in a conventional control manner in which the opening degree of the throttle valve is set to suck intake air in an amount to realize a torque required in the torque demand control like that used in this embodiment, it has been impossible to control intake air amount to a target value for realizing the required torque.

However, according to the above embodiment of the present invention, the amount of EGR gas is converted into the amount of fresh air in accordance with the quantity of state of the EGR gas to obtain the fresh air amount conversion value, by using the fresh air amount conversion coefficient for the EGR gas. The temperature correction term in the calculation equation for the fresh air amount conversion coefficient is determined in accordance with engine speed and combustion condition (stratified charge combustion or homogeneous charge combustion), while the pressure correction term in the same calculation equation is determined in accordance with the output signal from the airflow meter and the like. Accordingly, the opening degrees of the throttle valve and the EGR valve can be calculated and set at optimum values even though the condition (pressure and temperature) within the intake system changes under the action of EGR gas. Consequently, the required intake air amount and EGR gas amount can be accurately determined thereby making it possible to accurately control the EGR rate while solving the problem of the step-wise torque change. Particularly in the torque demand control, it can be facilitated to control the intake air amount at a value necessary to realize the required toque.

Furthermore, according to this embodiment, the physical property values (such as specific-heat ratio and average molecular weight) of fresh air and EGR which values change in accordance with temperature, gas composition and the like are set or approximated at the constant value. This simplifies calculation of the respective correction terms of the calculation equation for the fresh air amount conversion coefficient KQEGA, thereby increasing the speed of calculation so as to shorten a time required for calculation.

Figure 15:
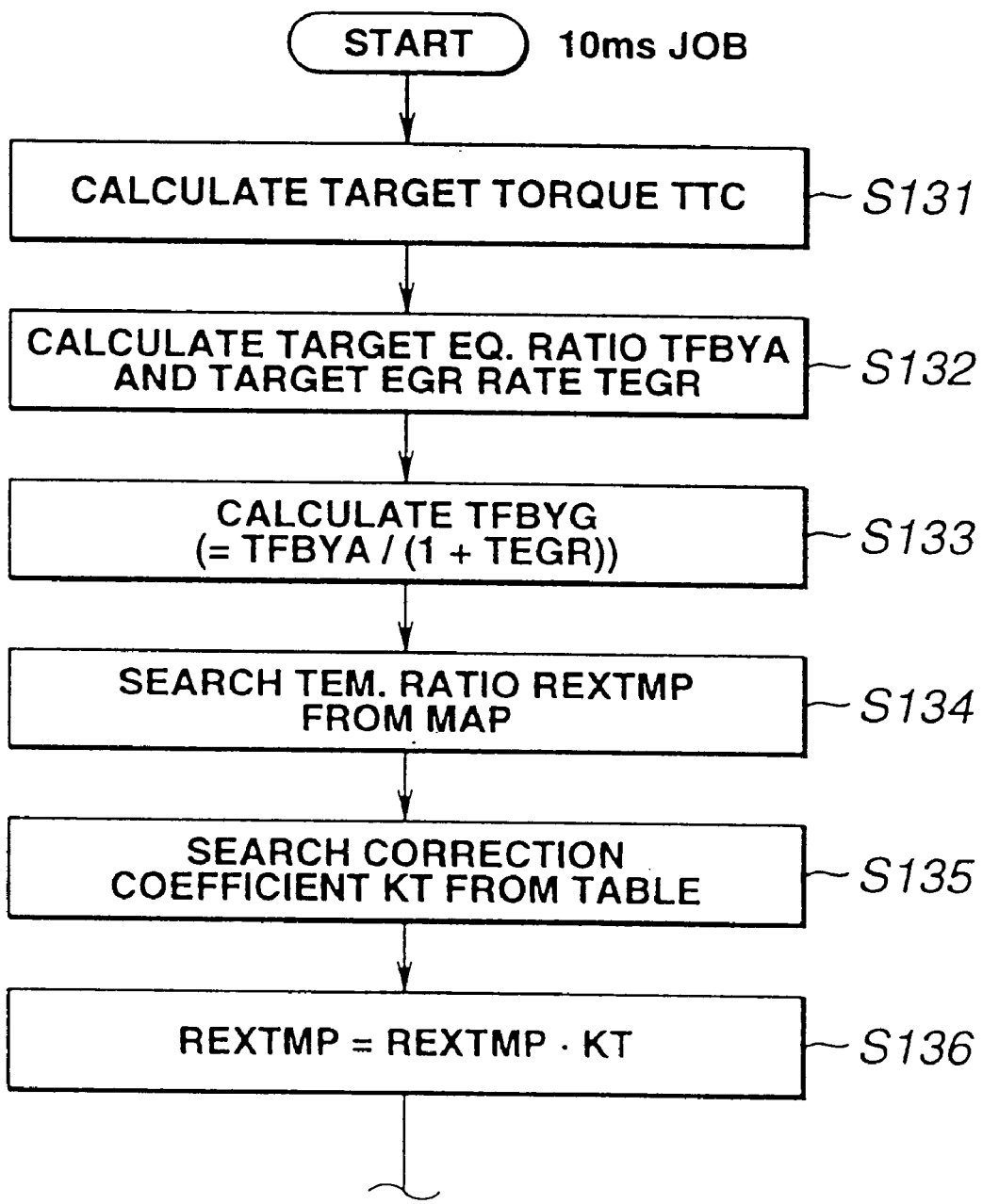
FIG. 15 is a part of a control routine similar to FIG. 9 but showing the control routine of a fourth embodiment of the engine according to the present invention.
Figure 16:
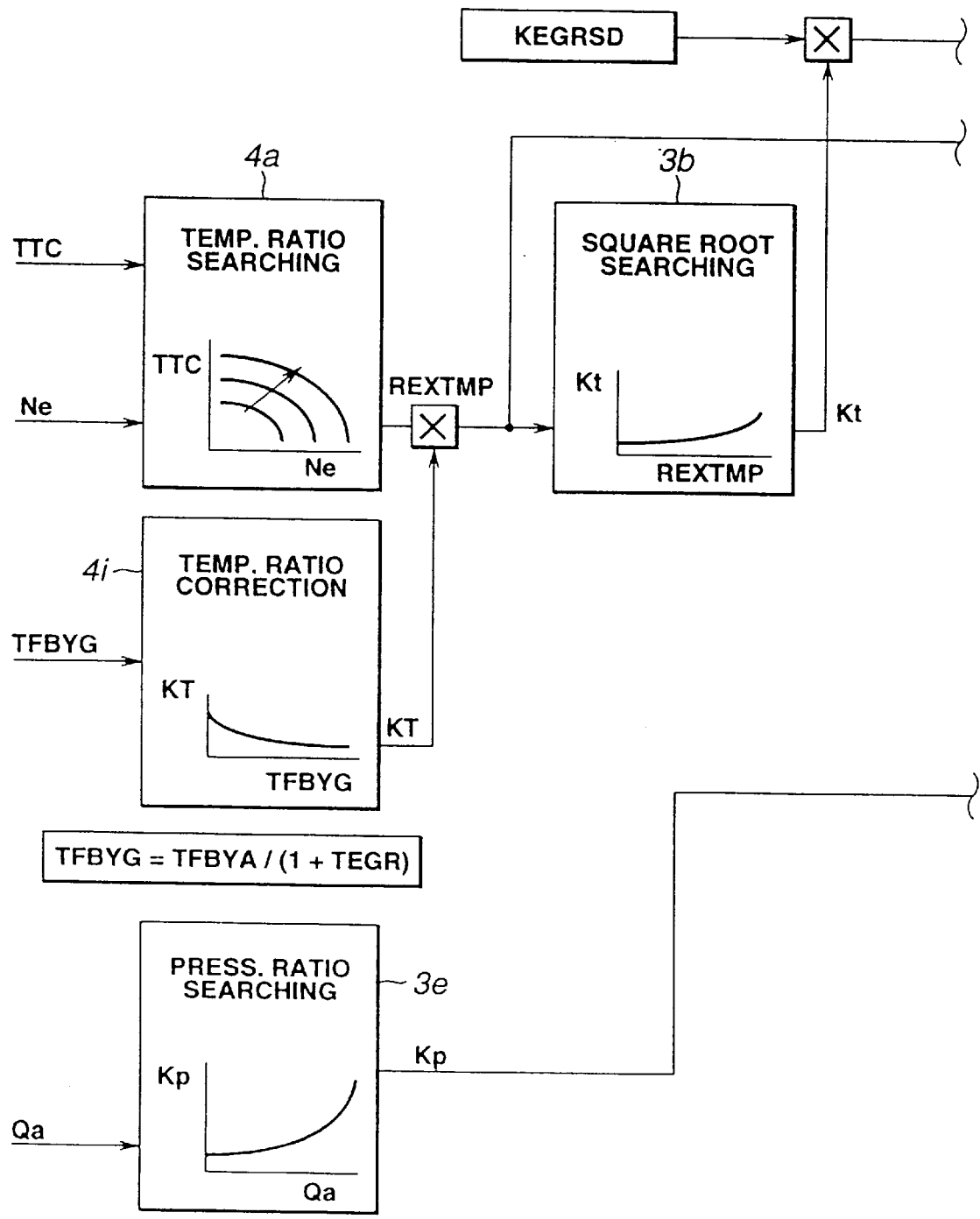
FIG. 16 is a part of a block diagram similar to FIG. 11 but showing a process for calculation of the fresh air amount conversion value used in the control routine of FIG. 15.

FIGS. 15 and 16 illustrate a fourth embodiment of the engine E according to the present invention, which is similar to the third embodiment of FIGS. 8 to 14. In this embodiment, only one map for the temperature ratio REXTMP is used in which correction is made to the searched values in accordance with combustion condition, in place of two maps (FIGS. 12 and 13) for the temperature ratio are used in the third embodiment of FIGS. 8 to 14.

Function of the fourth embodiment of the engine E will be discussed with reference to a flowchart of FIG. 15 and a block diagram of FIG. 16. The block diagram of FIG. 16 shows a part of calculation of the fresh air amount conversion coefficient (KQEGA), in which only a process for obtaining the temperature ratio REXTMP (including blocks 4a and 4i) is different from the block diagram of FIG. 11. Accordingly, the remaining part of the block diagram of FIG. 16 is the same as the block diagram of FIG. 11.

In the flowchart of FIG. 15, at a step S131, the target torque TTC is calculated in accordance with the accelerator operation amount detected by the accelerator operation amount sensor 1 and the engine speed Ne detected by the crank angle sensor 2.

At a step S132, a target equivalent ratio (stoichiometric air-fuel ratio/actual air-fuel ratio) TFBYA and the target EGR rate are calculated.

The target equivalent ratio TFBYA is calculated in accordance with a target air-fuel ratio suitable for an engine operating condition, such as the acceleration operation amount (representative of engine load) and the engine speed Ne. More specifically, the target equivalent ratio TFBYA is obtained by searching a map in accordance with the target torque TTC (or the acceleration operation amount) and the engine speed Ne so as to get a map-searched value, and by correcting the map-searched value with the engine coolant temperature, a vehicle speed and/or the like. Thus, the target equivalent ratio TFBYA is basically calculated as "standard air-fuel ratio (stoichiometric air-fuel ratio)/target air-fuel ratio"; however, this ratio may be corrected with the engine coolant temperature. In this regard, the contents of U.S. patent application Ser. No. 08/804,454 (corresponding to Japanese Patent Provisional Publication No. 9-287513) are hereby incorporated by reference.

At a step S133, a ratio TFBYG (=TFBYA/(1+TEGR)) is calculated from the target equivalent ratio TFBYA and the target EGR rate TEGR.

At a step S134, the temperature ratio REXTMP is searched in accordance with the engine speed and the target torque with reference to a map for the temperature ratio between exhaust gas and fresh air, at a temperature ratio calculation section 4a in FIG. 8.

At a step S135, a correction coefficient KT is searched in accordance with TFBYG with reference to a correction coefficient table for the temperature ratio between exhaust gas and fresh air, at a temperature ratio correction coefficient calculation section 4i in FIG. 16.

At a step S136, the temperature ratio REXTMP is multiplied by the correction coefficient KT thereby to correct the temperature ratio REXTMP (=REXTMP·KT).

After the step S136, the same processing as that of from the step S108 to S121 in the flowcharts of FIGS. 9 and 10 is made.

While the third and fourth embodiments have been shown and described for the engines (such as the cylinder direct injection spark-ignition internal combustion engine) in which the torque demand control is accomplished while controlling air-fuel ratio of air-fuel mixture to be supplied into the cylinders, it will be appreciated that the principle of the present invention may be applicable to engines for accomplishing non-torque demand control and to engines at which the air-fuel ratio is controlled at a value around the stoichiometric value. In the engines for accomplishing the non-torque demand control, the following control will be made: The sum of the intake air amount and the fresh air amount conversion value of the EGR gas is set as the total gas amount. Then, the total opening area is divided according to the ratio of the intake air amount and the total gas amount and the ratio of the fresh air amount conversion value, to obtain the opening areas of the throttle valve and the EGR valve.

Figure 4:
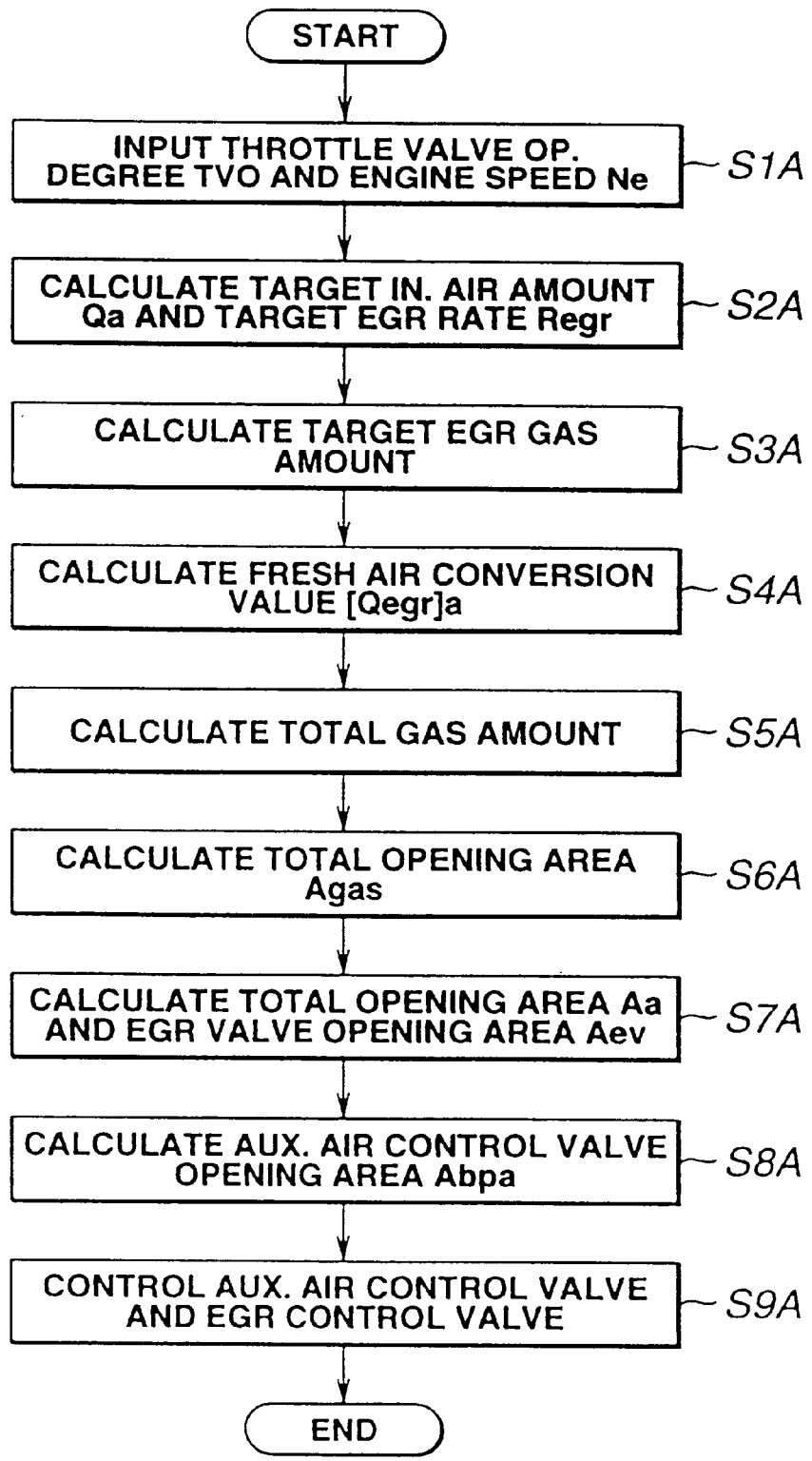
FIG. 4 is a flowchart of a control routine for an auxiliary air control valve and an EGR valve in the engine of FIG. 3.

Additionally, although the engines (for accomplishing the torque demand control) of the above embodiment are arranged to determine the temperature ratio REXTMP between exhaust gas and fresh air in the temperature correction term upon map-searching, in accordance with the value corresponding to the target torque and the engine speed, it will be understood that the temperature ratio REXTMP between exhaust gas and fresh air in the temperature correction term may be determined in accordance with the engine speed and a signal representative of engine load (for example, a pulse width or the like corresponding to an amount of intake air to be sucked into a cylinder) in place of the value corresponding to the target torque upon map-searching in engines for accomplishing non-torque demand control. In other words, the pulse width TP corresponding to the amount of air inside the cylinder is calculated at the step S101 in the flowchart of FIGS. 4 and 5, and at the step S131 in the flowchart of FIG. 15, in place of calculation of the target torque.

In the engines where air-fuel ratio changes throughout a wide range such as in the cylinder direct injection spark-ignition internal combustion engine in which fuel is directly injected into the combustion chamber, a changeover control between the map for stratified charge combustion and the map for homogeneous charge combustion is accomplished because temperature of exhaust gas changes in accordance with combustion condition (stratified charge combustion and homogeneous charge combustion) even at the same engine speed, target torque or pulse width TP corresponding to the intake air amount for the cylinder C. However, in the engines in where the air-fuel ratio is controlled around the stoichiometric value, the above changeover control or the like between the two maps is not required in the processing flowchart because exhaust gas temperature is generally constant if engine speed and engine torque are respectively at the same levels.

What is claimed is:

1. An internal combustion engine comprising:
   an EGR system fluidly connecting an intake air passage and an exhaust gas passage and for controlling an amount of EGR gas recirculated from said exhaust gas passage to said intake air passage; and a control system for controlling said EGR system and a fresh air amount metering valve of the engine, said control system including a section for calculating a fresh air amount conversion value of an amount of said EGR gas, the fresh air amount conversion value being converted from the amount of said EGR gas to the amount of the fresh air to be introduced to said intake air passage, and a section for controlling said EGR system in accordance with said fresh air amount conversion value.

2. An internal combustion engine as claimed in claim 1, wherein said fresh air amount metering valve comprises a throttle valve, said throttle valve controlling an amount of air to be sucked into the engine, wherein said control system further includes a section for calculating a target intake air amount of fresh air for said throttle valve, a section for calculating a target EGR amount for said EGR system, and a section for controlling said throttle valve in accordance with said target intake air amount.

3. An internal combustion engine as claimed in claim 2, wherein said control system includes a section for calculating opening degrees of said throttle valve and said EGR system in accordance with said target intake air amount and said fresh air amount conversion value, and a section for controlling said throttle valve and said EGR system in accordance with said opening degrees.

4. An internal combustion engine as claimed in claim 3, wherein said fresh air amount conversion value calculating section includes a section for calculating a total opening area of an intake system corresponding to a total gas amount which is a sum of said target intake air amount and said fresh air amount conversion value, a section for dividing said total opening area in accordance with a ratio between said target intake air amount and said fresh air amount conversion value to obtain an opening area of said fresh air amount metering valve and an opening area of an EGR valve of said EGR system.

5. An internal combustion engine as claimed in claim 1, wherein said fresh air amount conversion value calculating section includes a section for calculating a fresh air amount conversion coefficient in accordance with a quantity of state of the EGR gas and a quantity of state of said fresh air, and a section for converting a target value of the recirculated exhaust gas into an amount of said fresh air to obtain said fresh air amount conversion value.

6. An internal combustion engine as claimed in claim 4, wherein said fresh air amount metering valve is an electronically controlled throttle valve disposed in said intake air passage.

7. An internal combustion engine as claimed in claim 1, wherein said fresh air amount metering valve is an auxiliary air control valve disposed in an auxiliary air passage formed bypassing said intake air passage in which a throttle valve is disposed, an opening degree of said auxiliary air control valve being regulated relative to an opening degree of said throttle valve so as to obtain said target intake air amount.

8. An internal combustion engine as claimed in claim 2, wherein said control system includes a section for detecting an engine operating condition of the engine, said engine operating condition detecting section including a section for detecting an engine speed of the engine, and a section for detecting an operation amount of an accelerator, wherein said target intake air amount calculating section includes a section for calculating said target intake air amount in accordance with said engine speed and said accelerator operation amount.

9. An internal combustion engine comprising:

a throttle valve disposed in an intake system of the engine;

an EGR system for controllably recirculating EGR gas to the intake system, said EGR system including an EGR valve disposed in an EGR passage for fluidly connecting the intake system and an exhaust system of the engine, said EGR valve being adapted to control an amount of EGR gas recirculated from said exhaust gas passage to said intake air passage; and a control system including a section for converting an amount of said EGR gas into an amount of fresh air in accordance with a quantity of state of said EGR gas by using a conversion coefficient so as to obtain a fresh air amount conversion value, said conversion coefficient being calculated in accordance with at least a correction term relating to a temperature within the intake system, a section for determining a total gas amount in accordance with said fresh air amount conversion value and one of an intake air and an target intake air amount, a section for determining a total opening area of said throttle valve and an EGR valve in accordance with said total gas amount, and a section for dividing said total opening area into first and second opening areas according to a first ratio of said fresh air amount conversion value and the total gas amount and a second ratio of one of said intake air amount and said target intake air amount, so as to determine the first opening area for throttle valve and the second opening area for said EGR valve.

10. An internal combustion engine comprising:

a fresh air amount metering valve disposed in an intake air passage;

an EGR system for controlling an amount of EGR gas recirculated from an exhaust gas passage to the intake air passage, said EGR system including an EGR passage connecting the exhaust gas passage and the intake air passage, and an EGR valve disposed in said EGR passage; and a control system for controlling said EGR valve and said fresh air metering valve, said control system including a section for calculating a fresh air amount conversion value of an amount of said EGR gas, the fresh air amount conversion value being an amount of fresh air to be introduced to the intake system through said EGR system in place of the amount of said EGR gas, and a section for controlling respective opening degrees of said throttle valve and said EGR valve in accordance with said fresh air amount conversion value.

11. An internal combustion engine comprising:

an EGR system including an EGR valve disposed in an EGR passage for connecting an exhaust system and an intake system;

a fresh air amount metering valve disposed in the intake system;

a control system including a section for detecting an engine operating condition of the engine;

a section for calculating a target intake air amount in accordance with said engine operating condition;

a section for calculating a target EGR gas amount in accordance with said engine operating condition;

a section for calculating a fresh air amount conversion value of said target EGR gas amount, the fresh air amount conversion value being an amount of fresh air to be introduced through said EGR system in place of said target EGR gas amount, a section for calculating respective opening areas of said fresh air amount metering valve and said EGR valve in accordance with said target intake air amount and said fresh air amount conversion value, a section for controlling an opening degree of said fresh air amount metering valve in accordance with the opening area of said fresh air amount metering valve, and a section for controlling an opening degree of said EGR valve in accordance with the area of said EGR valve.

12. A method of controlling an internal combustion engine including an EGR system for fluidly connecting an intake air passage and an exhaust gas passage and for controlling an amount of EGR gas recirculated from said exhaust gas passage to said intake air passage, said method comprising the following steps:

calculating a fresh air amount conversion value of an amount of said EGR gas, the fresh air amount conversion value being an amount of fresh air to be introduced to said intake air passage through said EGR system in place of the amount of said EGR gas; and controlling said EGR system in accordance with said fresh air amount conversion value.

* * * * *